US008855660B2

(12) United States Patent
Ode et al.

(10) Patent No.: US 8,855,660 B2
(45) Date of Patent: Oct. 7, 2014

(54) MOBILE COMMUNICATIONS SYSTEM, WIRELESS COMMUNICATION APPARATUS, MOBILE COMMUNICATIONS APPARATUS, AND WIRELESS COMMUNICATION METHOD

(75) Inventors: Takayoshi Ode, Yokohama (JP); Yoshihiro Kawasaki, Yokosuka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/537,932

(22) Filed: Jun. 29, 2012

(65) Prior Publication Data

US 2012/0270540 A1 Oct. 25, 2012

Related U.S. Application Data

(63) Continuation of application No. PCT/JP2010/050192, filed on Jan. 12, 2010.

(51) Int. Cl.
*H04W 72/00* (2009.01)
*H04W 48/12* (2009.01)
*H04W 80/00* (2009.01)
*H04W 4/06* (2009.01)

(52) U.S. Cl.
CPC .............. *H04W 80/00* (2013.01); *H04W 48/12* (2013.01); *H04W 4/06* (2013.01)
USPC ........ 455/450; 455/451; 455/452.1; 455/446; 455/426.1; 370/331; 370/338

(58) Field of Classification Search
USPC ................ 455/426.1, 552.1, 446–452.2, 509; 370/328–338
See application file for complete search history.

(56) References Cited

U.S. PATENT DOCUMENTS

| | | | |
|---|---|---|---|
| 6,374,109 B1 | 4/2002 | Shaheen et al. | |
| 6,600,917 B1 | 7/2003 | Maupin | |
| 7,710,910 B2 * | 5/2010 | Ode et al. | 370/323 |
| 7,953,050 B2 * | 5/2011 | Li et al. | 370/336 |

(Continued)

FOREIGN PATENT DOCUMENTS

| | | |
|---|---|---|
| CN | 101771951 A | 7/2010 |
| JP | 2009-218813 | 9/2009 |

(Continued)

OTHER PUBLICATIONS

International search report issued for corresponding Japanese Patent Application No. PCT/JP2010/050192 mailed Apr. 20, 2010 with English translation.

(Continued)

*Primary Examiner* — Sharad Rampuria
(74) *Attorney, Agent, or Firm* — Myers Wolin, LLC

(57) ABSTRACT

In a wireless communication apparatus, a first generation unit generates first broadcast information used in processing of a first-type mobile station and a second-type mobile station. A second generation unit generates second broadcast information used in processing of the second-type mobile station. A transmission unit transmits the first broadcast information through a first broadcast channel and transmits the second broadcast information through a second broadcast channel. In a mobile communications apparatus operating as the second-type mobile station, a reception unit receives the first broadcast information transmitted through the first broadcast channel and the second broadcast information transmitted through the second broadcast channel. A control unit controls communication with the wireless communication apparatus using the first and second broadcast information.

14 Claims, 24 Drawing Sheets

(56) References Cited

U.S. PATENT DOCUMENTS

| | | | |
|---|---|---|---|
| 8,300,555 B2 | 10/2012 | Horn et al. | |
| 8,340,004 B2* | 12/2012 | Bachu et al. | 370/294 |
| 8,369,274 B2* | 2/2013 | Sawai | 370/329 |
| 8,374,212 B2* | 2/2013 | Charbit et al. | 375/132 |
| 8,385,273 B2 | 2/2013 | Harada et al. | |
| 8,514,740 B2* | 8/2013 | Iwamura et al. | 370/252 |
| 8,559,950 B2* | 10/2013 | Choi et al. | 455/435.1 |
| 8,565,260 B2* | 10/2013 | Kwon et al. | 370/464 |
| 8,594,672 B2* | 11/2013 | Agrawal et al. | 455/436 |
| 8,619,725 B2* | 12/2013 | Ode et al. | 370/336 |
| 8,705,461 B2* | 4/2014 | Bala et al. | 370/329 |
| 2010/0054161 A1 | 3/2010 | Montojo et al. | 370/280 |
| 2010/0113041 A1* | 5/2010 | Bienas et al. | 455/450 |
| 2011/0007673 A1* | 1/2011 | Ahn et al. | 370/280 |
| 2011/0090817 A1 | 4/2011 | Qu et al. | |
| 2011/0194523 A1* | 8/2011 | Chung et al. | 370/329 |
| 2011/0223922 A1* | 9/2011 | Kiiski et al. | 455/446 |
| 2012/0300732 A1* | 11/2012 | Ode | 370/329 |
| 2013/0023204 A1* | 1/2013 | Ode et al. | 455/11.1 |

FOREIGN PATENT DOCUMENTS

| | | |
|---|---|---|
| JP | 2011-501603 | 1/2011 |
| JP | 2011-525327 A | 9/2011 |
| JP | 2011-526107 A | 9/2011 |
| TW | 200807946 | 2/2008 |
| TW | 200948124 | 11/2009 |
| WO | 2009/057032 | 5/2009 |
| WO | 2009/153165 A1 | 12/2009 |
| WO | 2009/155859 A1 | 12/2009 |
| WO | 2009/157168 | 12/2009 |

OTHER PUBLICATIONS

LG Electronics; "Initial Access Procedure in LTE-Advanced"; Agenda Item 15.4; 3GPP TSG RAN WG1 Meeting #57; R1-092128; San Francisco, USA; May 4-8, 2009.

3rd Generation Partnership Project; Technical Specification Group Radio Access Network; "Feasibility study for Further Advancements for E-UTRA (LTE-Advanced) (Release 9)"; 3GPP TS 36.912 V9.0.0; Sep. 2009.

3rd Generation Partnership Project; Technical Specification Group Radio Access Network; "Evolved Universal Terrestrial Radio Access (E-UTRA) Radio Resource Control (RRC); Protocol specification (Release 9)"; 3GPP TS 36.331 V9.0.0; Sep. 2009.

Extended European search report issued for corresponding Application EP No. 10843014.1, dated Nov. 25, 2013.

Huawei; "Concept for Downlink Carrier Aggregation in LTE-Advanced"; R1-083703; 3GPP TSG RAN WG1 Meeting #54bis; Prague, Czech Rep.; Sep. 29-Oct. 3, 2008.

Huawei; "Carrier Aggregation in Idle Mode"; R2-093105; 3GPP TSG-RAN WG2 Meeting #66; San Francisco, USA, May 4-8, 2009.

Qualcomm Europe; "Notion of Anchor Carrier in LTE-A"; R1-090860; 3GPP TSG RAN WG1 #56; Athens, Greece; Feb. 9-13, 2009.

CMCC; "Multicarrier Operation and PDCCH Design of Carrier Aggregation"; R1-084333; 3GPP TSG RAN WG1 meeting #55; Prague, Czech Republic; Nov. 10-14, 2008.

ETSI TR 136 912 V9.1.0; LTE; Feasibility Study for Further Advancements for E-UTRA (LTE-Advanced) (3GPP TR 36.912 Version 9.1.0 Release 9); Jan. 2010.

Qualcomm Europe; "Support of Rel-8 UEs by LTE-A Relays"; 3GPP RAN WG1#55; R1-084384; Prague, Czech Republic; Nov. 10-14, 2008.

Alcatel-Lucent, "Component carrier indication for bandwidth extension in LTE-A", Agenda Item: 15.4, R1-093362, <URL:http://www.3gpp.org/ftp/tsg_ran/WG1_RL1/TSGR1_58/Docs/R1-093362.zip>, Aug. 24-28, 2009, pp. 1-5, 3GPP TSG-RAN WG1 #58, Shenzhen, China.

Office Action issued for corresponding Japanese Patent Application No. 2011-549794, dated Jul. 9, 2013, with English translation.

Nortel Networks; "Control channel design for the support of wider bandwidth for LTE-Advanced"; Agenda Item: 15.4; 3GPP TSG-RAN WG1 #57; R1-091923; San Francisco, US; May 4-8, 2009.

Decision of rejection issued for corresponding Japanese Patent Application No. 2011-549794, issued Oct. 8, 2013, with translation of relevant part p. 1, line 14 to p. 2, line 9.

Office Action issued for corresponding Taiwan Patent Application No. 99100654, dispatched/received on May 22, 2013, with English translation of the Taiwan Office Action Search Report.

Korean Office Action issued for corresponding Korean Patent Application No. 10-2013-7034579, mailed on Apr. 10, 2014, with an English translation.

Zhang et al., "QoS Performance Analysis on Carrier Aggregation Based LTE-A Systems", pp. 253-256, Dec. 7-9, 2009, Wireless Mobile and Computing (CCWMC 2009), IET International Communication Conference, IET, Shanghai, China.

First Notification of Office Action issued for corresponding Chinese Patent Application No. 201080061003.6, dated Jun. 23, 2014, with an English translation.

Catt, "Physical cell ID and PSCH configuration for LTE-A", Agenda Item: 12.1, Feb. 9-13, 2009, 3GPP TSG RAN WG1 #56, R1-090940, Athens, Greece.

Office Action issued for corresponding Japanese Patent Application No. 2014-000202, issued Jul. 22, 2014, with partial English translation.

LG Electronics; "Carrier aggregation and control signaling for LTE-A"; Agenda Item: 12; 3GPP TSG RAN WG1 #54; R1-082946; Jeju, Korea; Aug. 18-22, 2008.

LG Electronics; "Initial Access Procedure in LTE-Advanced"; Agenda Item: 11.1; 3GPP TSG RAN WG1 Meeting #55; R1-084196; Prague, Czech Republic; Nov. 10-14, 2008.

Office Action issued for corresponding Japanese Patent Application No. 2013-183693, dated Aug. 19, 2014, with a partial English translation.

* cited by examiner

MOBILE COMMUNICATIONS SYSTEM, WIRELESS COMMUNICATION APPARATUS, MOBILE COMMUNICATIONS APPARATUS, AND WIRELESS COMMUNICATION METHOD

CROSS-REFERENCE TO RELATED APPLICATION

This application is a continuation application of International Application PCT/JP2010/050192, filed on Jan. 12, 2010 and designated the U.S., the entire contents of which are incorporated herein by reference.

FIELD

The present invention is directed to a mobile communications system, a wireless communication apparatus, a mobile communications apparatus, and a wireless communication method.

BACKGROUND

Currently, mobile communications systems such as mobile phone systems and wireless MANs (Metropolitan Area Networks) have come into common use. In addition, active discussions on next generation mobile communications technology have been continued in order to further increase the speed and capacity of wireless communication.

For example, the 3GPP (3rd Generation Partnership Project), which is a standards body, has proposed a communication standard called LTE (Long Term Evolution) which allows communication using a frequency band up to 20 MHz (see, for example, 3GPP, "Evolved Universal Terrestrial Radio Access (E-UTRA) Radio Resource Control (RRC); Protocol specification", 3GPP TS 36.331 V9.0.0, 2009-09). Further, a communication standard called LTE-A (LTE-Advanced) which allows communication using up to five 20-MHz carriers (that is, frequency bands up to 100 MHz) has been proposed as a next generation communication standard after the LTE standard (see, for example, 3GPP, "Feasibility study for Further Advancements for E-UTRA (LTE-Advanced)", 3GPP TR 36.912 V9.0.0, 2009-09).

Such a next generation mobile communications system is sometimes defined as an extension from its previous generation mobile communications system, rather than being defined as something different from the previous generation mobile communications system. In this case, it may be required that base stations and relay stations complying with the next generation communication standard maintain backward compatibility to accommodate mobile stations complying with the previous generation communication standard. For example, the above-described LTE-A has been proposed as a communication standard extended from LTE. Accordingly, base stations and relay stations complying with LTE-A may be required to accommodate both mobile stations complying with LTE and mobile stations complying with LTE-A.

Note that there is a proposed communication system in which, when a base station transmits an dedicated control signal to terminals under the management of the base station, the dedicated control signal is transmitted using an extended wireless resource region as an dedicated control channel (see, for example, Japanese Laid-open Patent Publication No. 2009-218813). In addition, there is a proposed technique that, in an LTE system, a base station is able to inhibit access from all mobile stations by using Access Barring Information included in a SIB (System Information Block) which is broadcast by a broadcast channel (see, for example, Section 6.3.1 of 3GPP, "Evolved Universal Terrestrial Radio Access (E-UTRA) Radio Resource Control (RRC); Protocol specification", 3GPP TS 36.331 V9.0.0, 2009-09).

It is sometimes the case that a wireless communication apparatus, such as a base station and a relay station, complying with a next generation communication standard needs to broadcast information not included in broadcast information of a previous generation communication standard to cells under the management of the wireless communication apparatus. For example, while one frequency band (for example, 20 MHz) is used in LTE, multiple frequency bands (for example, 20 MHz×5) may be used in LTE-A. In such a situation, it is conceivable that a base station and a relay station complying with LTE-A need to broadcast information on the multiple frequency bands, which is not broadcast in LTE.

However, it becomes a problem how the wireless communication apparatus capable of accommodating both previous and next generation mobile stations broadcast the information not included in the broadcast information of the previous generation communication standard. Note that the above-described problem regarding the broadcast information is not limited to the case where a wireless communication apparatus accommodates both mobile stations complying with LTE and mobile stations complying with LTE-A, and can possibly occur in general in the case of accommodating multiple types of mobile stations.

SUMMARY

According to an aspect, there is provided a mobile communications system. The system includes: a wireless communication apparatus including a first generation unit configured to generate first broadcast information which is used in processing of a first-type mobile station and a second-type mobile station; a second generation unit configured to generate second broadcast information which is used in processing of the second-type mobile station; and a transmission unit configured to transmit the first broadcast information through a first broadcast channel and transmit the second broadcast information through a second broadcast channel; and a mobile communications apparatus operating as the second-type mobile station and including a reception unit configured to receive the first broadcast information transmitted through the first broadcast channel and the second broadcast information transmitted through the second broadcast channel; and a control unit configured to control communication with the wireless communication apparatus using the received first and second broadcast information.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Next, embodiments are explained in detail with reference to the drawings.

First Embodiment

Figure 1:
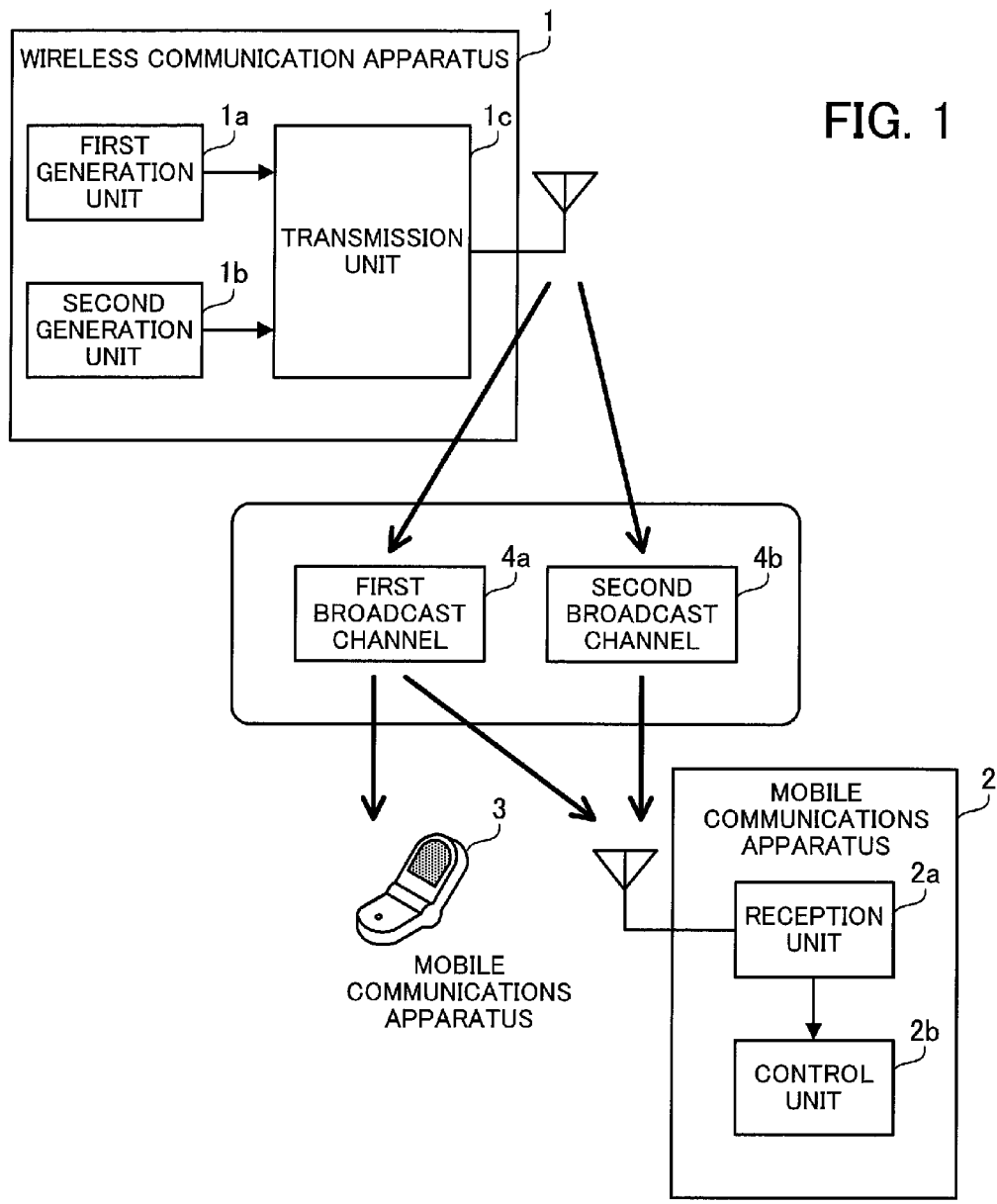
FIG. 1 illustrates a mobile communications system according to a first embodiment.

FIG. 1 illustrates a mobile communications system according to a first embodiment. The mobile communications system according to the first embodiment includes a wireless communication apparatus 1 and mobile communications apparatuses 2 and 3.

The wireless communication apparatus 1 is capable of performing wireless communication with first-type and second-type mobile stations. The wireless communication apparatus 1 is, for example, a base station, or a relay station for relaying wireless communication between a base station and a mobile station. The mobile communications apparatus 2 is a second-type mobile station, and the mobile communications apparatus 3 is a first-type mobile station. The mobile communications apparatuses 2 and 3 are wireless terminals, such as mobile telephones and mobile information terminals.

The wireless communication apparatus 1 includes a first generation unit 1a, a second generation unit 1b, and a transmission unit 1c. The first generation unit 1a generates first broadcast information to be used by both first-type mobile stations and second-type mobile stations. The second generation unit 1b generates second broadcast information that is not used by first-type mobile stations but used by second-type mobile stations. The transmission unit 1c transmits (broadcasts) the first broadcast information generated by the first generation unit 1a through a first broadcast channel 4a. In addition, the transmission unit 1c transmits (broadcasts) the second broadcast information generated by the second generation unit 1b through a second broadcast channel 4b, which is different from the first broadcast channel 4a.

The mobile communications apparatus 2 includes a reception unit 2a and a control unit 2b. The reception unit 2a receives the first broadcast information transmitted from the wireless communication apparatus 1 through the first broadcast channel 4a. In addition, the reception unit 2a receives the second broadcast information transmitted through the second broadcast channel 4b. The control unit 2b controls communication with the wireless communication apparatus 1 by referring to both the first and second broadcast information received by the reception unit 2a. On the other hand, the mobile communications apparatus 3 receives the first broadcast information, but does not receive the second broadcast information. That is, the mobile communications apparatus 3 controls communication with the wireless communication apparatus 1 without referring to the second broadcast information.

Here, the wireless communication apparatus 1 may perform wireless communication using multiple frequency bands. In that case, when transmitting the first broadcast information, the wireless communication apparatus 1 may include, in the first broadcast information, information to be used to set up a connection to the wireless communication apparatus 1 using each of the multiple frequency bands (for example, information indicating a bandwidth of each of the frequency bands). In addition, the wireless communication apparatus 1 may include, in the second broadcast information, information indicating the relationship between the multiple frequency bands and the types of mobile stations.

On the other hand, the mobile communications apparatus 2 may determine, among the multiple frequency bands, a frequency band available for second-type mobile stations based on the second broadcast information. Then, based on the first broadcast information in terms of the frequency band determined to be available, the mobile communications apparatus 2 may set up a connection to the wireless communication apparatus 1 using the available frequency band. The information indicating the relationship between the multiple frequency bands and the types of mobile stations may be defined as information having the following meanings, for example.

1) Information indicating a frequency band available for second-type mobile stations 2) Information indicating a frequency band unavailable for second-type mobile stations 3) Information indicating that a frequency band used to transmit the information is available for second-type mobile stations 4) Information indicating that a frequency band used to transmit the information is unavailable for second-type mobile stations In addition, the wireless communication apparatus 1 may attach identification information to each of the multiple frequency bands. The identification information may be used in the second broadcast information to indicate the relationship between the multiple frequency bands and the types of the mobile stations. As the identification information, cell IDs (identifications) or unique numbers in a single cell may be used, for example. In the case where cell IDs are used as the identification information, multiple cell IDs are assigned to one cell. In addition, mobile stations may recognize the individual, multiple frequency bands as (virtually) different cells.

The first broadcast channel 4a is set, for example, with respect to each of the multiple frequency bands. The second broadcast channel 4b may be set with respect to each of the multiple frequency bands, or set for only part of the frequency bands. In the latter case, the second broadcast channel 4b may be set in a predetermined frequency band (for example, a frequency band in the center on the frequency axis), or may be set in a frequency band available for second-type mobile stations. In addition, the second broadcast channel 4b may be set to be adjacent to the first broadcast channel 4a in a wireless resource region identified by frequency and time. In addition, the second broadcast channel 4b may be set to be adjacent to a synchronization channel used to transmit a synchronization signal.

Note that the mobile communication system may be implemented, for example, as an LTE-A system. In that case, a first-type mobile station may be implemented as a mobile station complying with LTE and a second-type mobile station may be implemented as a mobile station complying with LTE-A. In addition, the first broadcast channel 4a may be implemented as a broadcast channel commonly defined in both LTE and LTE-A and the second broadcast channel 4b may be implemented as an extended broadcast channel which is not defined in LTE. In addition, in LTE-A, each of the above-described multiple frequency bands is sometimes referred to as a component carrier (CC) or a carrier component (CC).

According to such a mobile communications apparatus of the first embodiment, the wireless communication apparatus 1 generates the first broadcast information to be used for processing of first-type and second-type mobile stations and the second broadcast information to be used for processing of second-type mobile stations. The first broadcast information is transmitted through the first broadcast channel 4a, and the second broadcast information is transmitted through the second broadcast channel 4b. In addition, the mobile communications apparatus 2 receives the first broadcast information transmitted through the first broadcast channel 4a and the second broadcast information transmitted through the second broadcast channel 4b. Based on the received first and second broadcast information, communication between the wireless communication apparatus 1 and the mobile communications apparatus 2 is controlled.

That is, broadcast information that is not used (or is not usable) by first-type mobile stations but used by second-type mobile stations is broadcast through a broadcast channel different from a broadcast channel through which broadcast information to be commonly used by first-type and second-type mobile stations is broadcast. With this, it is possible to efficiently achieve communication control in consideration of the existence of multiple types of mobile stations.

For example, in the case of implementing the mobile communication system as an LTE-A system, it is considered that broadcast information defined in LTE is broadcast through a conventional broadcast channel and, then, additional broadcast information defined in LTE-A is broadcast through an extended broadcast channel. In this case, the mobile communication system allows mobile stations complying with LTE-A to receive the additional broadcast information while allowing mobile stations complying with LTE (i.e., mobile stations not complying with LTE-A) to receive conventional broadcast information. That is, it is possible to achieve an efficient LTE-A system maintaining backward compatibility.

Further, it is possible to facilitate control of wireless resource allocation by including, in the second broadcast information, information indicating the relationship between the multiple frequency bands and the types of mobile stations and broadcasting the included information. That is, by designating and broadcasting a frequency band desired to be used (or desired not to be used) by second-type mobile stations, it is possible to readily lead second-type mobile stations to use a partial frequency band. In particular, in the case of the LTE-A system, mobile stations complying with LTE-A are able to use multiple frequency bands while mobile stations complying with LTE use only one frequency band. Accordingly, leading second-type mobile stations to use a partial frequency band is useful also in terms of improving the efficiency in wireless resource use.

A second embodiment described below is directed to a case in which the wireless communication method according to the first embodiment is applied to an LTE-A system. Note however that it is clear that the above-described wireless communication method is applicable to other types of mobile communications systems.

Second Embodiment

Figure 2:
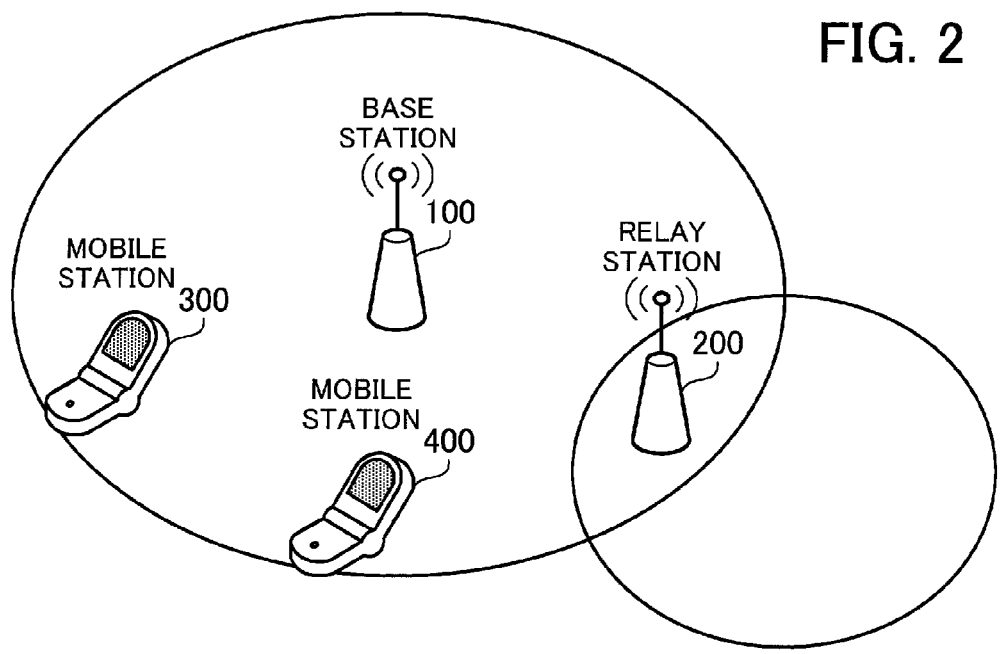
FIG. 2 illustrates a mobile communications system according to a second embodiment.

FIG. 2 illustrates a mobile communications system according to the second embodiment. The mobile communications system of the second embodiment includes a base station 100, a relay station 200, and mobile stations 300 and 400. The mobile communications system complies with the LTE-A communication standard.

The base station 100 is a wireless communication apparatus capable of performing wireless communication with the mobile stations 300 and 400 either directly or via the relay station 200. The base station 100 is connected to a wired upper-level network (not illustrated) and transfers data between the upper-level network and the mobile stations 300 and 400. The base station 100 manages three cells (also sometimes referred to as the "sectors") under its control. The base station 100 uses five component carriers (referred to hereinafter as the "CCs") in the wireless communication.

The relay station 200 is a wireless communication apparatus for relaying wireless communication between the base station 100 and the mobile stations 300 and 400 in the case where the mobile stations 300 and 400 are present in the managed cells. The relay station 200 is also sometimes referred to as the "transfer station". For wireless communication, the relay station 200 uses the same five CCs of the frequency bands that are used by the base station 100.

The mobile stations 300 and 400 are wireless terminals for performing wireless communication by setting up a connection to the base station 100 or the relay station 200, and are mobile telephones or mobile information terminals, for example. The mobile station 300 is capable of receiving data simultaneously using up to five CCs in a downlink (a wireless link from the base station 100 or the relay station 200 to the mobile station 300) and transmitting data simultaneously using up to two CCs in an uplink (a wireless link from the mobile station 300 to the base station 100 or the relay station 200). On the other hand, the mobile station 400 transmits and receives data using only one of the CCs in both the downlink and uplink.

Note here that, in this embodiment, a mobile station which does not use multiple CCs in aggregation is referred to as an LTE mobile station, and a mobile station capable of using multiple CCs in aggregation is referred to as an LTE-A mobile station. The mobile station 300 is an LTE-A mobile station, and the mobile station 400 is an LTE mobile station. Both LTE-A mobile stations and LTE mobile stations can set up a connection to the base station 100 and the relay station 200.

Note that, in the 3GPP, the LTE communication standard is defined in the 3GGP Release 8 specifications and the LTE-A communication standard is defined in the 3GGP Release 10 specifications. Note however that not all mobile stations complying with the 3GGP Release 10 specifications are necessarily mobile stations (LTE-A mobile stations) capable of using multiple CCs in aggregation. That is, LTE mobile stations complying with the 3GGP Release 10 specifications may exist. In addition, according to this embodiment, mobile stations complying with the 3GGP Release 9 specifications are treated as LTE mobile stations, as in the case of mobile stations complying with the 3GGP Release 8 specifications.

Figure 3:
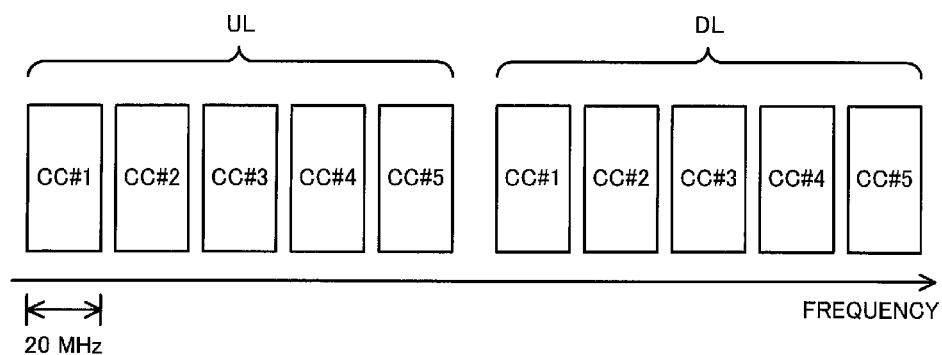
FIG. 3 illustrates a configuration example of component carriers.

FIG. 3 illustrates a configuration example of component carriers. The base station 100 and the relay station 200 use five CCs, as illustrated in FIG. 3. In the case of using Frequency Division Duplex (FDD) for bidirectional communication, frequency bands of CC#1 to CC#5 are provided individually for the downlink (DL) and the uplink (UL). In the following description, the pairs of the DL frequency bands and the UL frequency bands are sometimes referred to simply as CC#1 to CC#5. For both the DL and UL, each CC has a bandwidth of 20 MHz, and the total bandwidth is 100 MHz. The base station 100 and the relay station 200 perform wireless resource allocation (scheduling) for each of CC#1 to CC#5.

Note that, according to the example of FIG. 3, bidirectional communication is achieved using FDD, however, bidirectional communication may be achieved using Time Division Duplex (TDD). In that case, five CCs are provided on the frequency axis with no separation between the DL and UL. In addition, all the CCs have a bandwidth of 20 MHz according to the example of FIG. 3, however, they may have another bandwidth (for example, 5 MHz, 10 MHz, or 15 MHz). Further, it is not necessary that all the CCs have the same bandwidth.

In addition, according to the example of FIG. 3, the UL wireless resources are provided on the lower frequency side and the DL wireless resources are provided on the higher frequency side. By providing the UL wireless resources on the lower frequency side, it is possible to keep the transmission power of the mobile stations 300 and 400 low since a signal of a lower frequency has a smaller propagation loss. Note however that the locations of the UL wireless resources and the DL wireless resources on the frequency axis may be switched.

Thus, by aggregating multiple CCs among CC#1 to CC#5, the mobile station 300 is capable of performing data transmission and reception using a wider bandwidth (for example, 40 MHz, 60 MHz, 80 MHz, or 100 MHz) than the bandwidth of one CC (for example, 20 MHz).

Note here that all CC#1 to CC#5 may be provided in a single frequency band, such as an 800 MHz band, a 2.5 GHz band, or a 3.5 GHz band, or may be provided separately in multiple different frequency bands. Aggregating multiple continuous or discontinuous CCs belonging to the same frequency band is sometimes referred to as the "carrier aggregation". On the other hand, aggregating CCs belonging to different frequency bands is sometimes referred to as the "spectrum aggregation".

Figure 4:
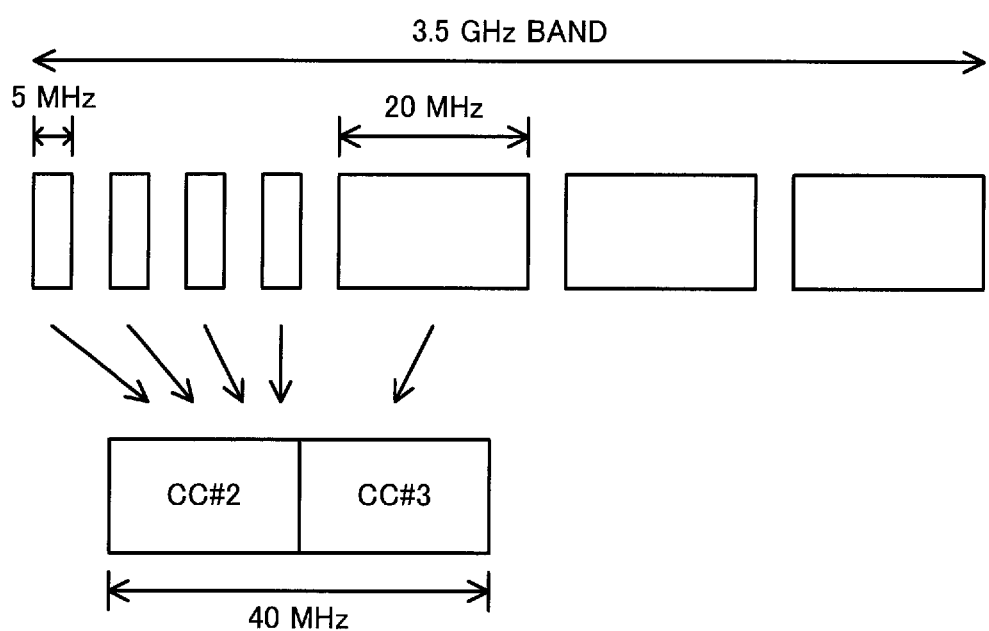
FIG. 4 illustrates a first example of carrier aggregation.

FIG. 4 illustrates a first example of the carrier aggregation. According to the example of FIG. 4, four discontinuous bands each having a bandwidth of 5 MHz and three discontinuous bands each having a bandwidth of 20 MHz are provided in the 3.5 GHz band as bands available for wireless communication. Then, the four 5 MHz bands are aggregated to thereby form CC#2 with a bandwidth of 20 MHz. In addition, one band with a bandwidth of 20 MHz is defined as CC#3.

The mobile station 300 is able to, for example, use CC#2 and CC#3 as a frequency band of 40 MHz (logically a single frequency band) by carrier aggregation. In this case, in reality, the mobile station 300 uses the four 5 MHz-bandwidth bands and one 20 MHz-bandwidth band belonging to the 3.5 GHz band. Although FIG. 4 illustrates an example of frequency bands belonging to the 3.5 GHz band, it is possible to aggregate and use bands each having a frequency bandwidth smaller than 20 MHz also in a different frequency band, such as the 800 MHz band.

Figure 5:
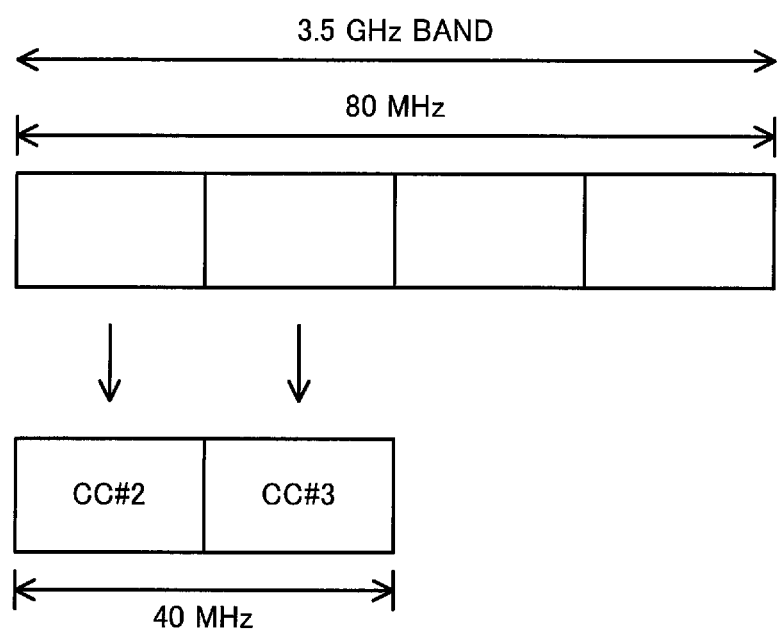
FIG. 5 illustrates a second example of the carrier aggregation.

FIG. 5 illustrates a second example of the carrier aggregation. According to the example of FIG. 5, a continuous 80 MHz-bandwidth band is provided in the 3.5 GHz band as a band available for wireless communication. Then, the 80 MHz-bandwidth band is divided into four, which are individually defined as CC#2 to CC#5 each having a bandwidth of 20 MHz.

The mobile station 300 is able to, for example, use CC#2 and CC#3 as a frequency band of 40 MHz (logically a single frequency band) by carrier aggregation. In this case, in reality, the mobile station 300 uses a part of the continuous 80 MHz-bandwidth band belonging to the 3.5 GHz band.

Figure 6:
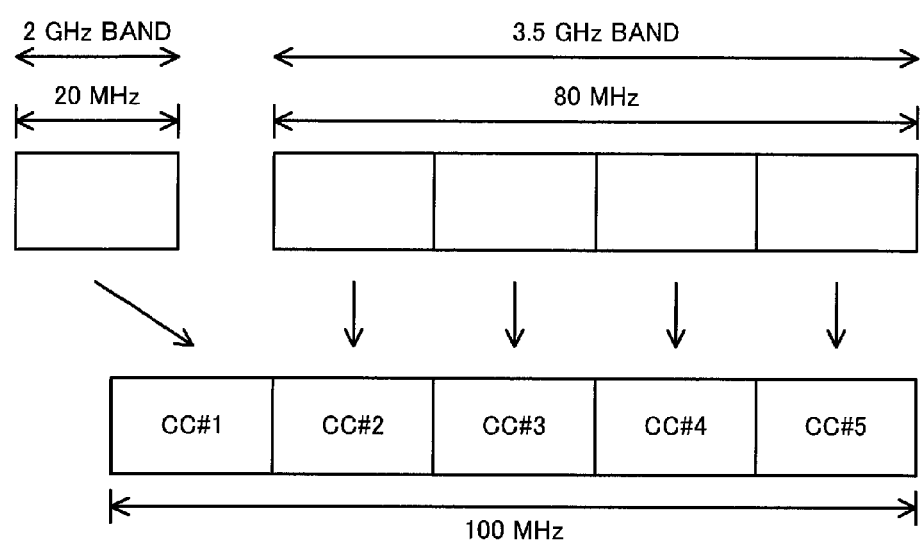
FIG. 6 illustrates an example of spectrum aggregation.

FIG. 6 illustrates an example of spectrum aggregation. According to the example of FIG. 6, a continuous 20 MHz-bandwidth band is provided in the 2 GHz band as a band available for wireless communication. In addition, a continuous 80 MHz-bandwidth band is provided in the 3.5 GHz band as a band available for wireless communication. Then, besides the 20 MHz-bandwidth band in the 2 GHz band is defined as CC#1, the 80 MHz-bandwidth band in the 3.5 GHz band is divided into four, which are individually defined as CC#2 to CC#5 each having a bandwidth of 20 MHz.

The mobile station 300 is able to, for example, use CC#1 to CC#5 as a frequency band of 100 MHz (logically a single frequency band) by spectrum aggregation. In this case, in reality, the mobile station 300 uses the 20 MHz-bandwidth band belonging to the 2 GHz band and the continuous 80 MHz-bandwidth band belonging to the 3.5 GHz band. Note that, as in the case of FIG. 4, CC#1 may be formed by aggregating multiple bands which belong to the 2 GHz band and each of which has a frequency width smaller than 20 MHz.

Figure 7:
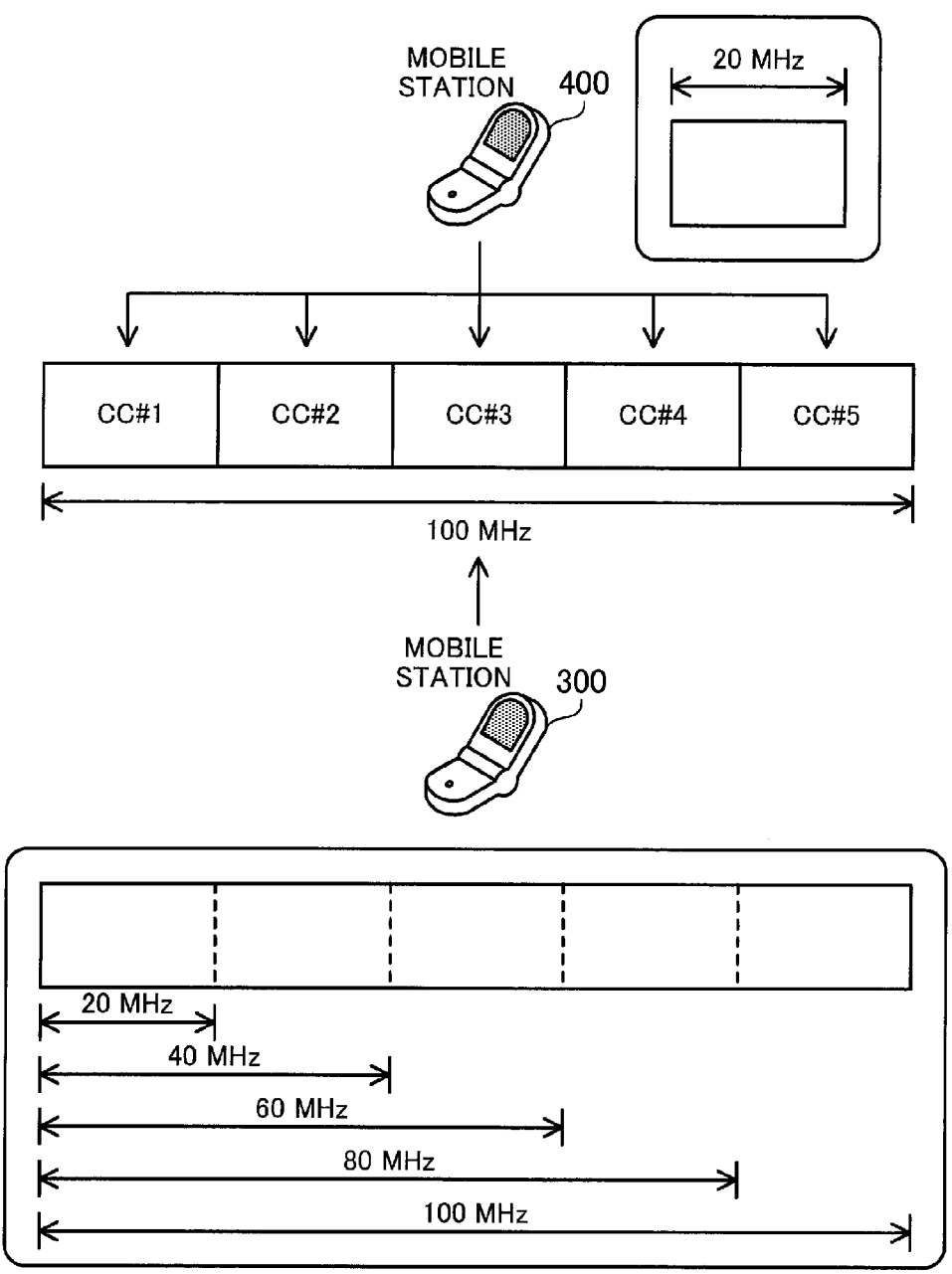
FIG. 7 illustrates a relationship between mobile stations and the component carriers.

FIG. 7 illustrates a relationship between mobile stations and component carriers. The mobile station 400 is an LTE mobile station, as mentioned above. Accordingly, the mobile station 400 does not apply carrier aggregation or spectrum aggregation, and performs data transmission and reception using one of CC#1 to CC#5. That is, the mobile station 400 uses a frequency band with a bandwidth of up to 20 MHz.

On the other hand, the mobile station 300 is an LTE-A mobile station. Accordingly, the mobile station 300 is capable of performing data transmission and reception using multiple CCs among CC#1 to CC#5 by applying carrier aggregation or spectrum aggregation. That is, the mobile station 300 is capable of performing data transmission (uplink communication) using a frequency band with a bandwidth of 20 MHz or 40 MHz. In addition, the mobile station 300 is capable of performing data reception (downlink communication) using a frequency band with a bandwidth of 20 MHz, 40 MHz, 60 MHz, 80 MHz, or 100 MHz.

The base station 100 and the relay station 200 assign an ID to each CC in order to identify CC#1 to CC#5 in the cells under the management. The following methods, for example, are conceivable for assigning IDs.

1) Method of Assigning a Cell ID to Each CC

Generally, in an LTE system, one cell ID is assigned to each cell (sector). On the other hand, five cell IDs are assigned to each cell. Then, the five cell IDs are associated with CC#1 to CC#5 so as to make each CC identifiable.

2) Method of Assigning an Extended Cell ID to Each CC

Generally, in an LTE system, 504 cell IDs are prepared and a mobile station identifies individual neighboring cells using cell IDs. Assigning five cell IDs to each cell may cause lack of cell IDs in relation to the design of the mobile communication system. In that case, extended cell IDs whose total number is larger than cell IDs defined in the LTE standard are defined, and five extended cell IDs are assigned to each cell. Then, the five extended cell IDs are associated with CC#1 to CC#5 so as to make each CC identifiable.

3) Method of Assigning, to Each CC, a Number Unique in a Cell

Numbers unique at least within a cell are assigned to CC#1 to CC#5 as CC numbers. For example, with respect to each cell, numbers "1", "2", "3", "4", and "5" are given to CC#1, CC#2, CC#3, CC#4, and CC#5, respectively. Note that it is sufficient if the cell numbers are unique at least within the cell, and numbers may be given to CCs of multiple cells. For example, numbers may be given to CCs of multiple cells managed by the same base station or relay station.

Figure 8:
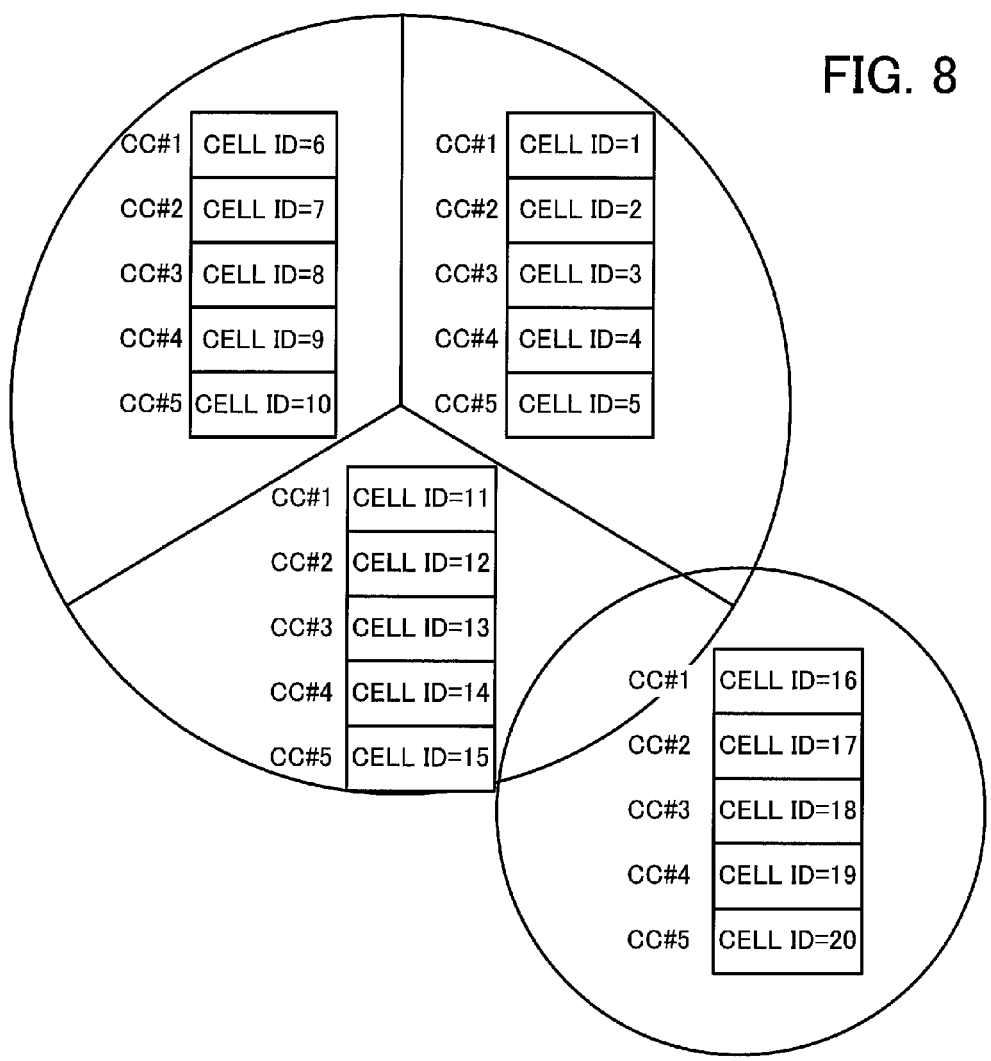
FIG. 8 illustrates a first example of assigning component carrier identification information.

FIG. 8 illustrates a first example of assigning component carrier identification information. The example of FIG. 8 is a case of adopting the first or second method described above. Cell IDs (or extended cell IDs) "1" to "5" are assigned to CC#1 to CC#5 of a first cell managed by the base station 100. Cell IDs (or extended cell IDs) "6" to "10" are assigned to CC#1 to CC#5 of a second cell managed by the base station 100. Cell IDs (or extended cell IDs) "11" to "15" are assigned to CC#1 to CC#5 of a third cell managed by the base station 100. In addition, cell IDs (or extended cell IDs) "16" to "20" are assigned to CC#1 to CC#5 of a cell managed by the relay station 200.

Figure 9:
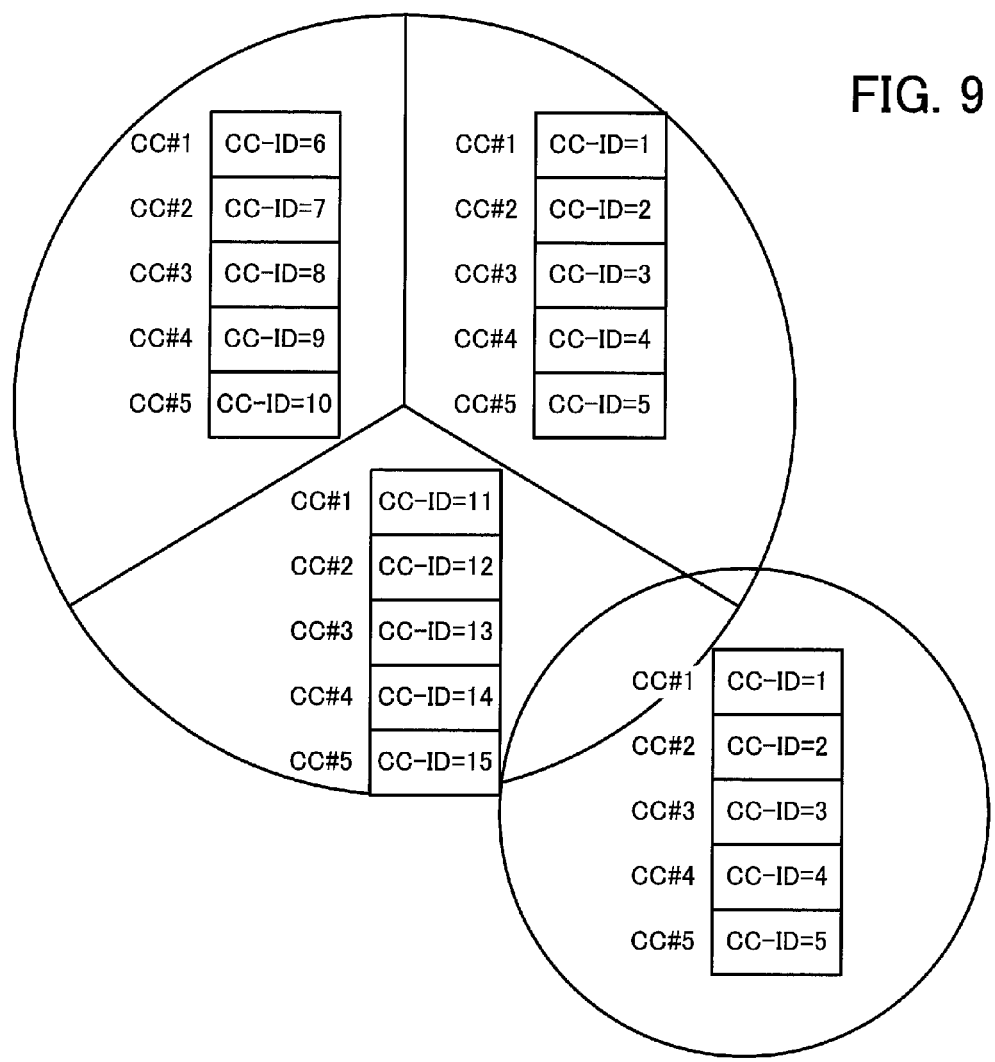
FIG. 9 illustrates a second example of assigning the component carrier identification information.

FIG. 9 illustrates a second example of assigning the component carrier identification information. The example of FIG. 9 is a case of adopting the third method described above. Cell numbers "1" to "5" are assigned to CC#1 to CC#5 of the first cell managed by the base station 100. Cell numbers "6" to "10" are assigned to CC#1 to CC#5 of the second cell managed by the base station 100. Cell numbers "11" to "15" are assigned to CC#1 to CC#5 of the third cell managed by the base station 100. In addition, cell numbers "1" to "5" are assigned to CC#1 to CC#5 of the cell managed by the relay station 200.

Figure 10:
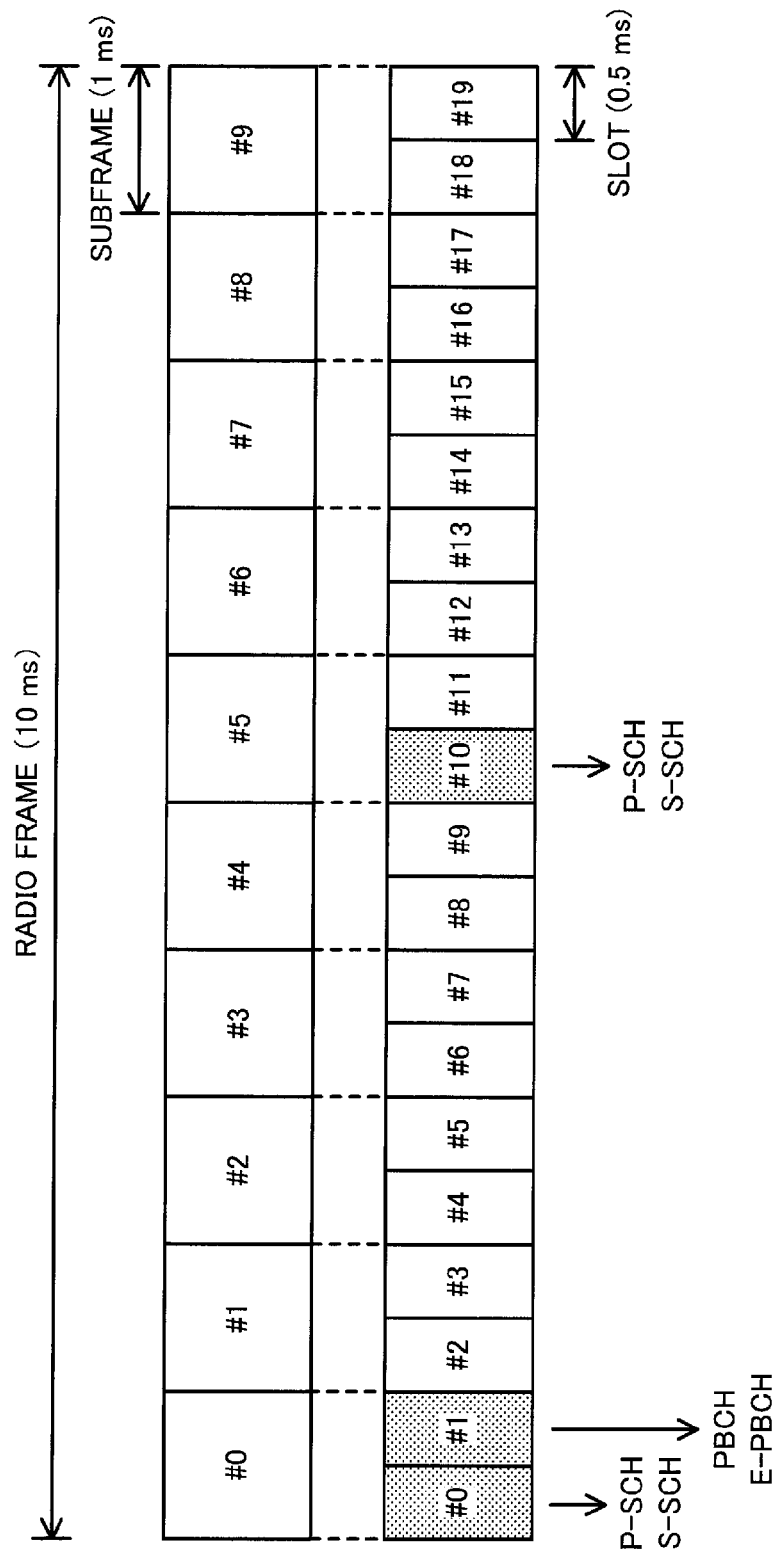
FIG. 10 illustrates a structural example of a radio frame.

FIG. 10 illustrates a structural example of a radio frame. In each of CC#1 to CC#5, the radio frame as illustrated in FIG. 10 is transmitted and received between the base station 100 and the mobile station 300/400, and between the relay station 200 and the mobile station 300/400. Note however that the structure of FIG. 10 is merely an example, and the structure of a radio frame is not limited to this example.

According to the example, a radio frame having a cycle of 10 ms includes 10 subframes (Subframes #0 to #9) each having a width of 1 ms. Each subframe includes two slots each having a width of 0.5 ms. That is, the 10 ms-cycle radio frame includes 20 slots (Slot#0 to Slot#19).

In a DL radio frame, a Primary Synchronization CHannel (P-SCH) and a Secondary Synchronization CHannel (S-SCH) for transmitting synchronization signals are assigned to Slot#0 and Slot#10. In addition, a Physical Broadcast CHannel (PBCH) and an Extended Physical Broadcast CHannel (E-PBCH) for transmitting (broadcasting) broadcast information are assigned to Slot#1.

Wireless resources in the radio frame are managed by being subdivided in the time and frequency directions. OFDMA (Orthogonal Frequency Division Multiple Access) is used for DL frames, and SC-FDMA (Single-Carrier Frequency Division Multiple Access) is used for UL frames. Time and frequency wireless resources are assigned to each channel.

Each slot includes 7 or 6 symbols in the time direction. In a symbol, a signal called "CP (Cyclic Prefix)" is inserted. There are two types of CPs, a normal CP and an extended CP having a different length from each other. 7 symbols are included in one slot in the case of a normal CP, and 6 symbols are included in one slot in the case of an extended CP. In the frequency direction, a CC includes multiple subcarriers.

Figure 11:
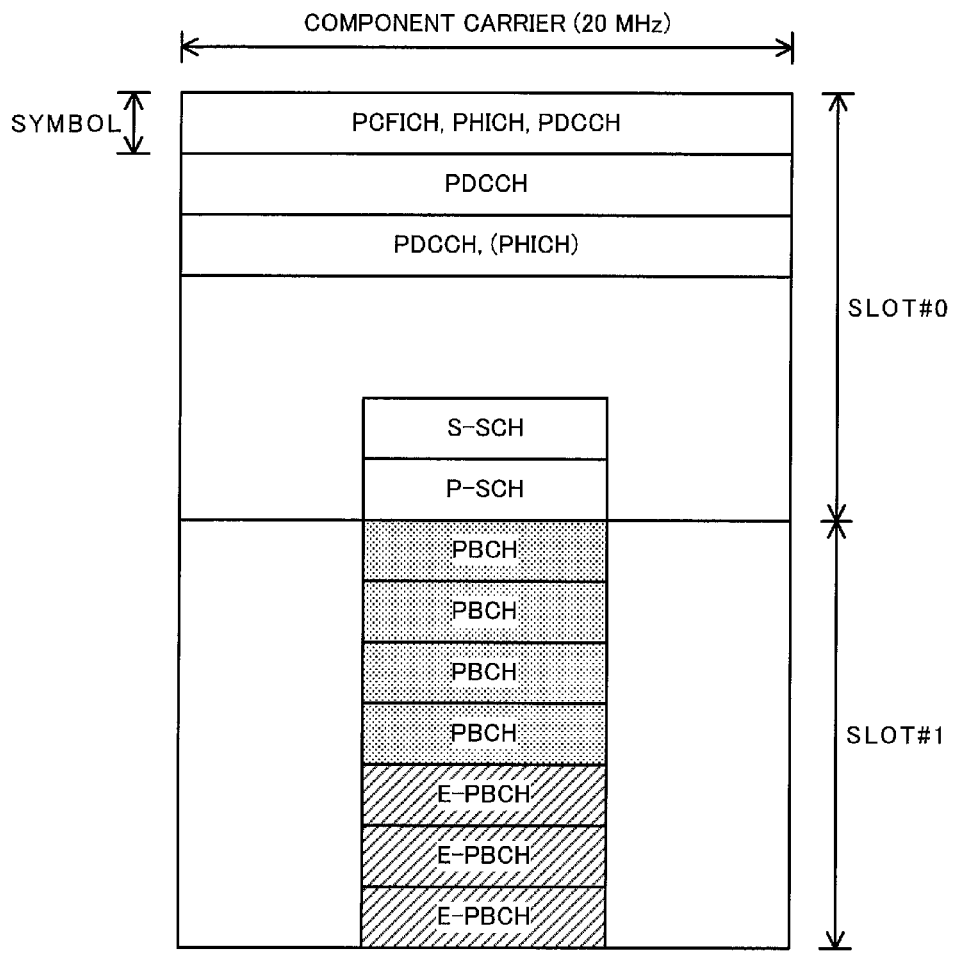
FIG. 11 illustrates a first example of allocating an extended physical broadcast channel.

FIG. 11 illustrates a first example of allocating an extended physical broadcast channel. In FIG. 11, the vertical direction represents a time axis and the horizontal direction represents a frequency axis. In addition, the example of FIG. 11 is a case of using normal CPs, that is, a case where 7 symbols are included in one slot.

In a DL frame, a PCFICH (Physical Control Format Indicator CHannel) and a PHICH (Physical Hybrid automatic repeat request Indicator CHannel) are assigned to the first symbol of Slot#0. The PCIFH is a channel for transmitting data indicating the number of symbols to which a Physical Downlink Control CHannel (PDCCH) is assigned. The PHICH is a channel for returning an ACK (ACKnowledgement) response or a NACK (Negative ACKnowledgement) response with regard to data reception. The PHICH may be assigned to the third symbol.

In addition, the above-described PDCCH is assigned to the first symbol of Slot#0. The PDCCH is a channel for transmitting L1/L2 (Layer 1/Layer 2) control information. The PDCCH may also be assigned to the second and third symbols. The number of symbols for the PDCCH is variable between 1 and 3.

Further, in Slot#0, the above-described S-SCH is assigned to the sixth symbol, and the above-described P-SCH is assigned to the seventh symbol. The P-SCH is a channel in which one of a predetermined number (for example, 3) of primary synchronization signal sequences is transmitted. The S-SCH is a channel in which one of a predetermined number (for example, 168) of secondary synchronization signal sequences is transmitted. Combinations of the P-SCH sequences and the S-SCH sequences (for example, 3×168=504 combinations) correspond to cell IDs.

In the case of adopting the first method described above as a method of assigning IDs to CCs, that is, in the case of assigning cell IDs different from each other to CC#1 to CC#5, the P-SCH sequence and the S-SCH sequence vary from one CC to another. Note that, as described above, the P-SCH and S-SCH are also assigned to Slot#10. Note however that although the P-SCH sequence transmitted in Slot#10 is the same as that transmitted in Slot#0, the S-SCH sequence transmitted in Slot#10 is different from that transmitted in Slot#0.

In addition, in Slot#1, the above-described PBCH is assigned to the first to fourth symbols, and the above-described E-PBCH is assigned to the fifth to seventh symbols. In the wireless resource region, the E-PBCH is adjacent to the PBCH in the time direction. The PBCH is a broadcast channel commonly defined in LTE and LTE-A. The E-PBCH is a broadcast channel added in LTE-A. That is, the mobile station 300, which is an LTE-A mobile station, is capable of detecting both the PBCH and the E-PBCH. On the other hand, the mobile station 400, which is an LTE mobile station, is able to detect the PBCH but not the E-PBCH.

Broadcast information transmitted through the PBCH includes information to be used by the mobile station 300/400 to set up a connection to a CC in which the PBCH is provided. For example, the broadcast information of the PBCH includes information indicating a frequency bandwidth (for example, 5 MHz, 10 MHz, 15 MHz, or 20 MHz). This is because frequency bandwidths are variable in LTE and LTE-A.

Broadcast information transmitted by the E-PBCH (extended broadcast information) may include information related to multiple CCs having been configured. For example, in order to facilitate scheduling, the base station 100 or the relay station 200 may limit CCs available for LTE mobile stations to set up a connection and CCs available for LTE-A mobile stations to set up a connection. In that case, it is represented that information indicating correspondence between CC#1 to CC#5 and types of mobile stations is transmitted by being included in the extended broadcast information. With this, the mobile station 300 which is an LTE-A mobile station is able to recognize connection-allowed CCs before having access to the base station 100 or the relay station 200. This sets up the connection processing more efficient.

Conceivable methods for indicating correspondence between CC#1 to CC#5 and types of mobile stations are, for example: configuring CCs available for LTE-A mobile stations to set up a connection; configuring CCs not available for LTE-A mobile stations to set up a connection; configuring CCs available for LTE mobile stations to set up a connection; and configuring CCs not available for LTE mobile station to set up a connection. In the extended broadcast information, IDs given to individual CCs may be used to identify the CCs. Note however that the extended broadcast information is not limited to information indicating correspondence between CC#1 to CC#5 and types of mobile stations, and may include various other types of information.

The S-SCH, P-SCH, PBCH and E-PBCH may be assigned only to partial frequencies (subcarrier), as illustrated in FIG. 11, rather than being assigned to the entire frequencies (subcarrier) of one CC. For example, these channels are assigned to frequencies near the center of the CC. The channel assignment is made to frequencies near the center of the CC, not to frequencies near the boundary of the CC, in order to facilitate channel detection performed by the mobile station 300/400. Frequencies assigned to the E-PBCH may be the same as, or different from, those assigned to the PBCH.

In addition, in a DL frame, a Reference Signal (RS) which is a known pilot signal is transmitted using a part of resources different from the wireless resources used for the above-described channels. Using the RS, the mobile station 300/400 is able to measure the received power and received quality.

Figure 12:
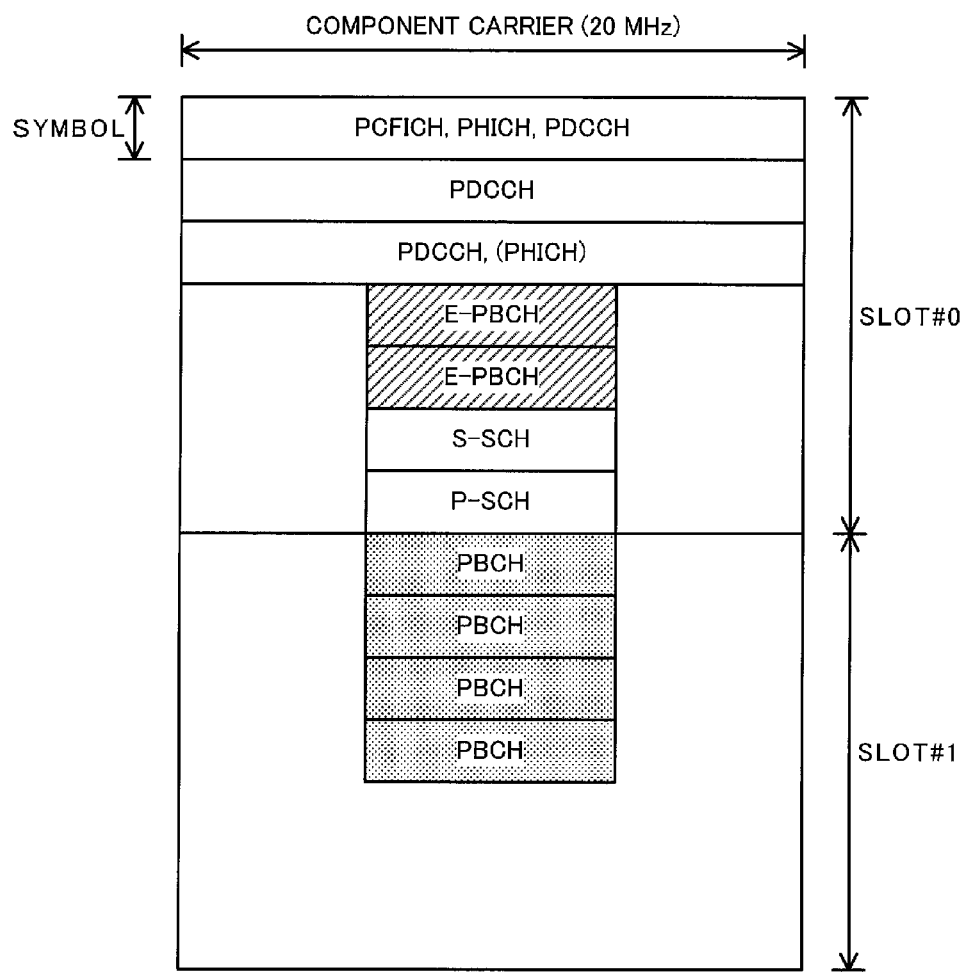
FIG. 12 illustrates a second example of allocating the extended physical broadcast channel.

FIG. 12 illustrates a second example of allocating the extended physical broadcast channel. The allocating example of FIG. 12 is the same as the example illustrated in FIG. 11 except for the location in which the E-PBCH is set. According to the example of FIG. 12, the E-PBCH is assigned to the fourth and fifth symbols of Slot#0. In the wireless resource region, the E-PBCH is adjacent to the S-SCH in the time direction. Frequencies assigned to the E-PBCH may be the same as, or different from, those assigned to the S-SCH.

Figure 13:
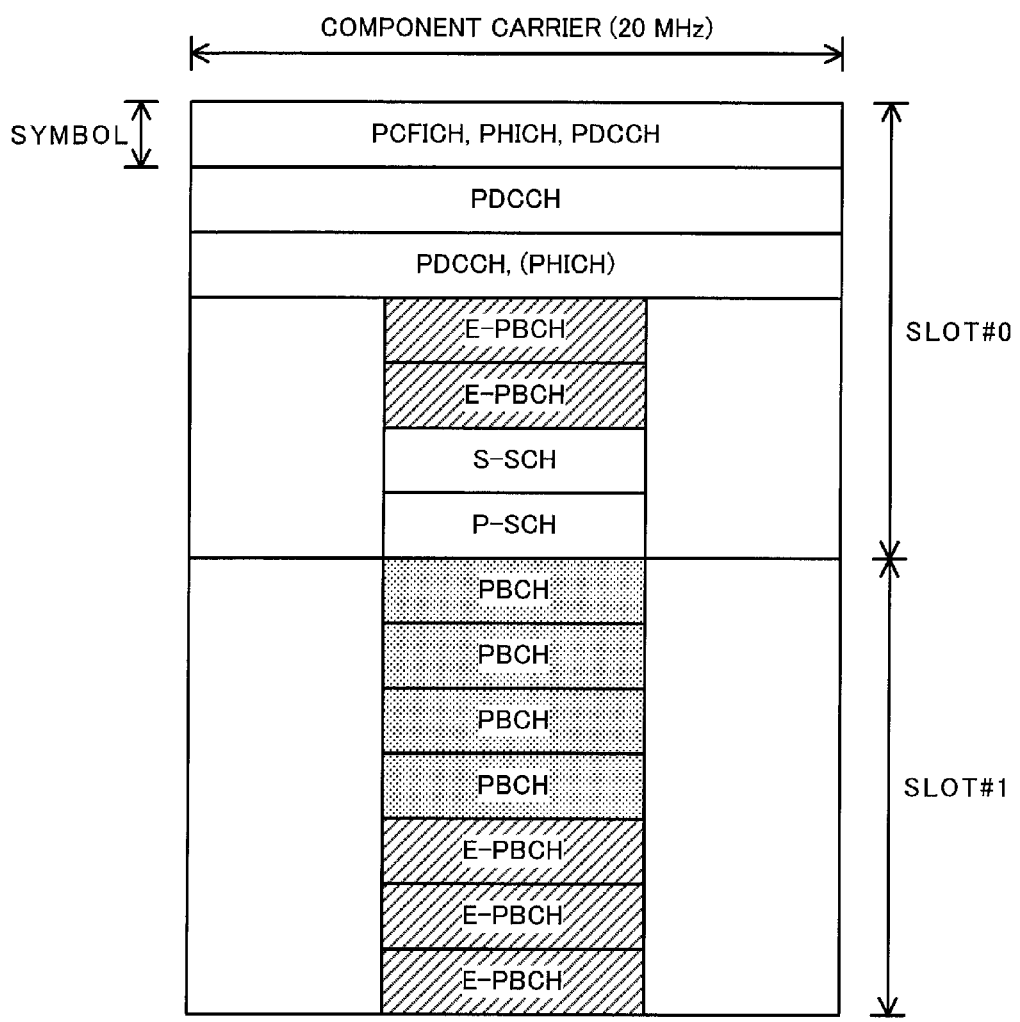
FIG. 13 illustrates a third example of allocating the extended physical broadcast channel.

FIG. 13 illustrates a third example of allocating the extended physical broadcast channel. The allocating example of FIG. 13 is the same as the examples illustrated in FIGS. 11 and 12 except for the location in which the E-PBCH is set. According to the example of FIG. 13, the E-PBCH is assigned to both the fourth and fifth symbols of Slot#0 and the fifth to seventh symbols of Slot#1. In the wireless resource region, the E-PBCH is adjacent to the S-SCH and the PBCH in the time direction. Subcarrier frequencies assigned to the E-PBCH may be the same as, or different from, those assigned to the S-SCH and the PBCH.

An increase in the amount of wireless resources assigned to the E-PBCH in the above-described manner allows more extended broadcast information to be transmitted. Wireless resources assigned to the E-PBCH may be made variable according to the amount of extended broadcast information to be transmitted. In addition, as illustrated in FIGS. 11 to 13, setting the E-PBCH adjacent to at least one of the synchronization channel and the PBCH in the time direction facilitates the mobile station 300 to detect the E-PBCH. Note however that the adjacency setting may be made not in the time direction but in the frequency direction. In addition, the E-PBCH may be set to be adjacent to none of the synchronization channel and the PBCH.

Figure 14:
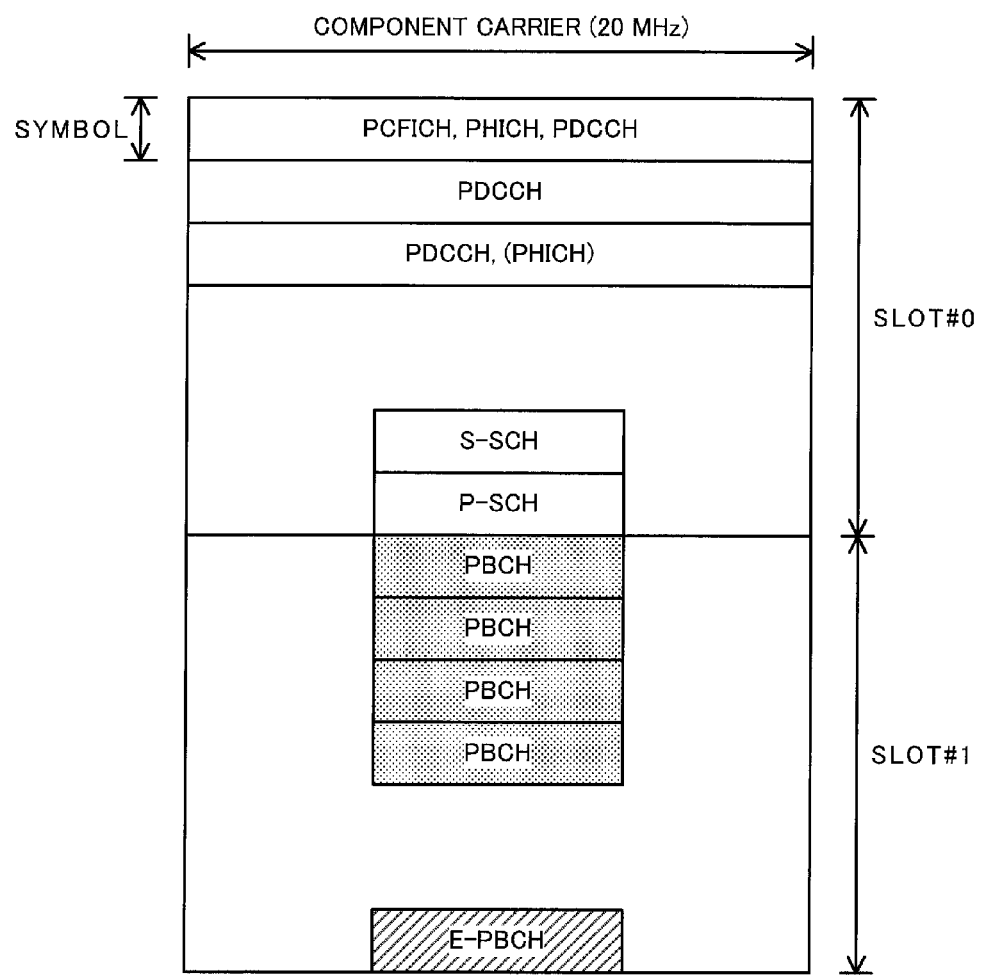
FIG. 14 illustrates a fourth example of allocating the extended physical broadcast channel.

FIG. 14 illustrates a fourth example of allocating the extended physical broadcast channel. The allocating example of FIG. 14 is the same as the examples illustrated in FIGS. 11 to 13 except for the location in which the E-PBCH is set. According to the example of FIG. 14, the E-PBCH is assigned to the seventh symbol of Slot#1. In the wireless resource region, the E-PBCH is not adjacent to the PBCH. Frequencies assigned to the E-PBCH may be the same as, or different from, those assigned to the PBCH.

Figure 15:
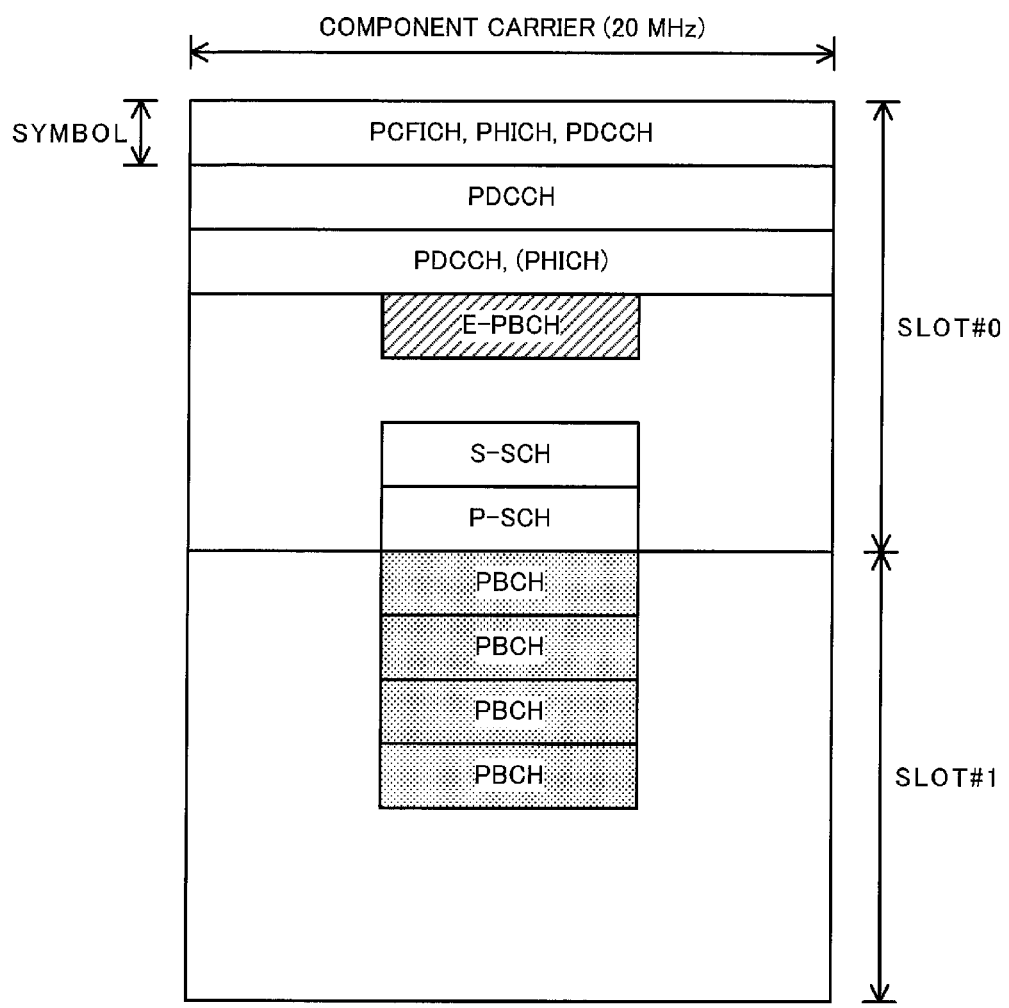
FIG. 15 illustrates a fifth example of allocating the extended physical broadcast channels.

FIG. 15 illustrates a fifth example of allocating the extended physical broadcast channel. The allocating example of FIG. 15 is the same as the examples illustrated in FIGS. 11 to 14 except for the location in which the E-PBCH is set. According to the example of FIG. 15, the E-PBCH is assigned to the fourth symbol of Slot#0. In the wireless resource region, the E-PBCH is not adjacent to the S-SCH. Frequencies assigned to the E-PBCH may be the same as, or different from, those assigned to the S-SCH.

Figure 16:
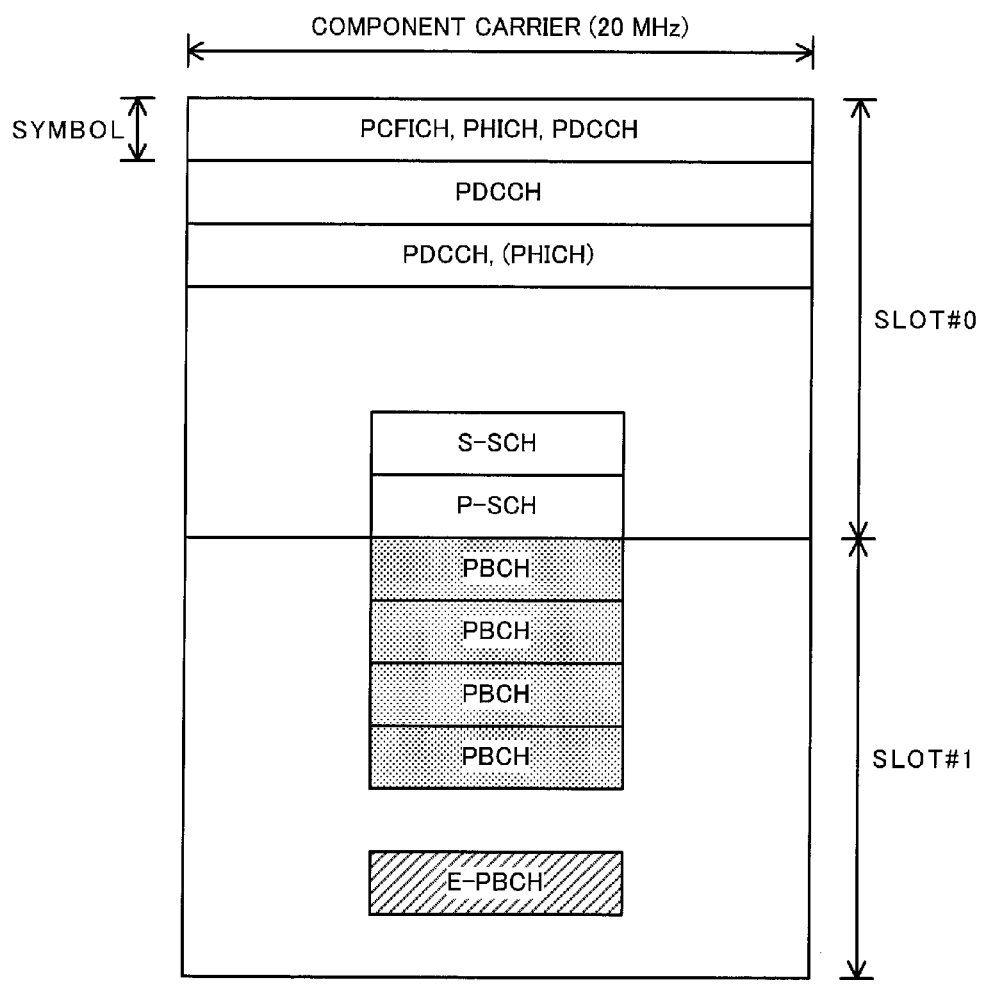
FIG. 16 illustrates a sixth example of allocating the extended physical broadcast channels.

FIG. 16 illustrates a sixth example of allocating the extended physical broadcast channel. The allocating example of FIG. 16 is the same as the examples illustrated in FIGS. 11 to 15 except for the location in which the E-PBCH is set. According to the example of FIG. 16, the E-PBCH is assigned to the sixth symbol of Slot#1. In the wireless resource region, the E-PBCH is not adjacent to the PBCH. Frequencies assigned to the E-PBCH may be the same as, or different from, those assigned to the PBCH.

FIGS. 11 to 16 above take as an example the case of using a normal CP as the CP (i.e., the case where 7 symbols are included in one slot). However, also in the case of using an extended CP as the CP (the case where 6 symbols are included in one slot), the E-PBCH may be set based on similar considerations. In that case, the E-PBCH is assigned to, for example, the fifth and sixth symbols of Slot#1 in the method of FIG. 11; the fourth symbol of Slot#0 in the method of FIG. 12; the fourth symbol of Slot#0 and the fifth and sixth symbols of Slot#1 in the method of FIG. 13; and the sixth symbol of Slot#1 in the method of FIG. 14.

Figure 17:
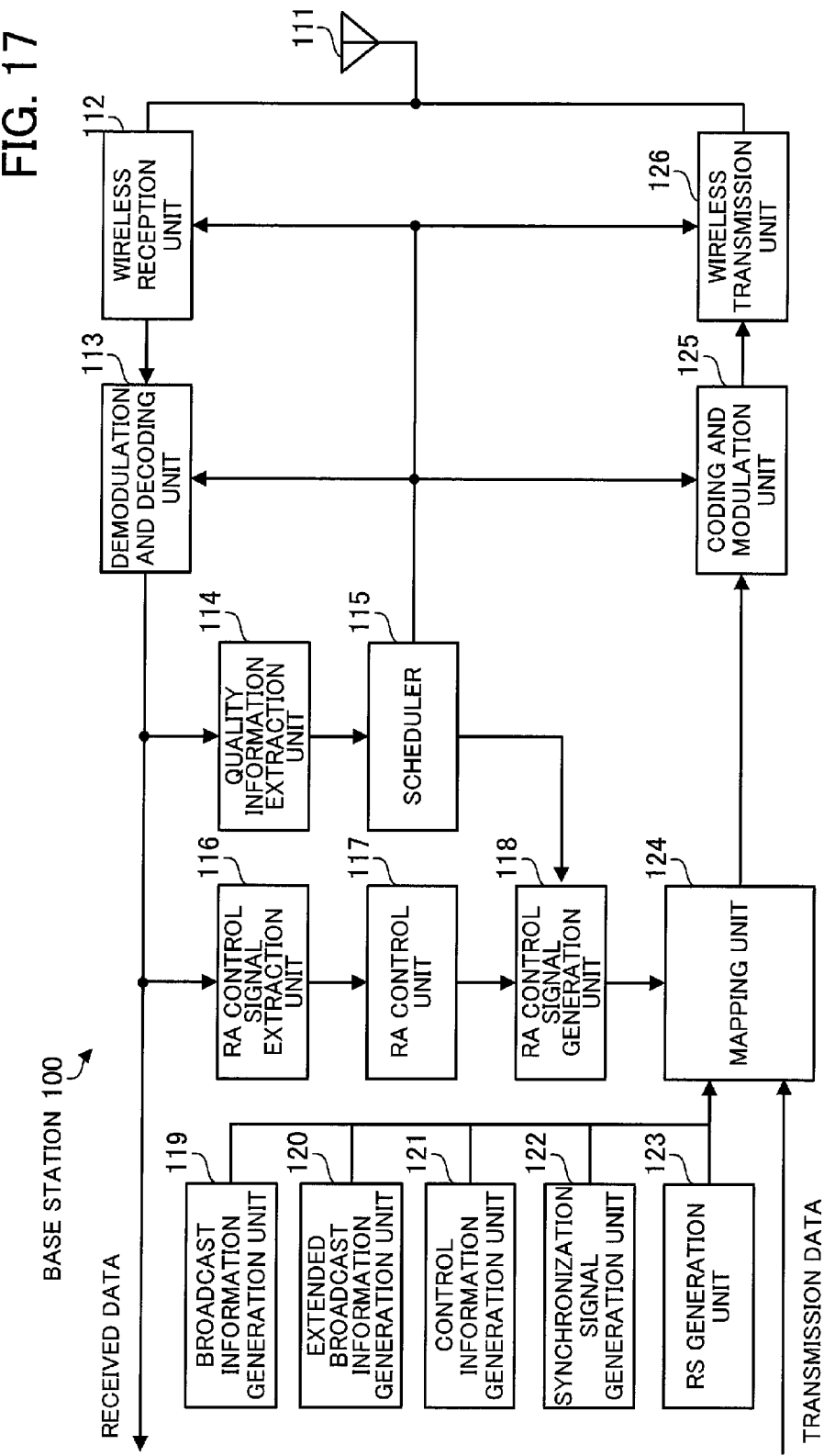
FIG. 17 is a block diagram of a base station.

FIG. 17 is a block diagram illustrating a base station. The base station 100 includes a transmitting and receiving antenna 111; a wireless reception unit 112; a demodulation and decoding unit 113; a quality information extraction unit 114; a scheduler 115; an RA control signal extraction unit 116; an RA control unit 117; an RA control signal generation unit 118; a broadcast information generation unit 119; an extended broadcast information generation unit 120; a control information generation unit 121; a synchronization signal generation unit 122; an RS generation unit 123; a mapping unit 124; a coding and modulation unit 125; and a wireless transmission unit 126.

The transmitting and receiving antenna 111 receives wireless signals transmitted by the relay station 200 and the mobile station 300/400 and outputs the wireless signals to the wireless reception unit 112. In addition, the transmitting and receiving antenna 111 outputs a transmission signal acquired from the wireless transmission unit 126. Note that, instead of the two-way transmitting and receiving antenna, a transmitting antenna and a receiving antenna may be separately provided in the base station 100. In addition, diversity transmission may be employed using multiple transmitting and receiving antennas.

The wireless reception unit 112 performs wireless signal processing on a signal acquired from the transmitting and receiving antenna 111 and converts the high-frequency wireless signal into a baseband signal as a low-frequency signal (down-conversion). For the wireless signal processing, the wireless reception unit 112 includes, for example, a Low Noise Amplifier (LNA), a frequency converter, a Band Pass Filter (BPF), an A/D (Analog to Digital) converter. Frequency bands for reception are notified of by the scheduler 115.

The demodulation and decoding unit 113 demodulates and error correction decodes the baseband signal acquired from the wireless reception unit 112, and then outputs obtained data (including user data and control information). The demodulation and decoding are performed by methods corresponding to a predetermined Modulation and Coding Scheme (MCS) or an MCS notified of by the scheduler 115. Choices for the modulation scheme include digital modulation schemes such as QPSK (Quadrature Phase Shift Keying) and 16QAM (Quadrature Amplitude Modulation). Choices for the coding scheme include turbo coding and Low Density Parity Check (LDPC) coding. The extracted user data is converted into packet format and then transferred to the upper-level network.

The quality information extraction unit 114 extracts a wireless quality measurement report which is control information transmitted by the mobile station 300/400. Subsequently, the quality information extraction unit 114 outputs the extracted measurement report to the scheduler 115.

The scheduler 115 allocates wireless resources to the mobile station 300/400 based on the measurement report acquired from the quality information extraction unit 114. Subsequently, the scheduler 115 notifies the wireless reception unit 112, the demodulation and decoding unit 113, the RA control signal generation unit 118, the coding and modulation unit 125, and the wireless transmission unit 126 of the wireless resource allocation status. In addition, the scheduler 115 adaptively selects an MCS based on the measurement report. Then, the scheduler 115 notifies the demodulation and decoding unit 113 and the coding and modulation unit 125 of the selected MCS.

The RA control signal extraction unit 116 extracts a control signal transmitted by the mobile station 300/400 to the base station 100 at the time of random access (RA). The random access is a procedure performed between the mobile station 300/400 and the base station 100 when the mobile station 300/400 sets up a connection to the base station 100. The control signal extracted by the RA control signal extraction unit 116 includes a random access preamble signal transmitted through a Physical Random Access CHannel (PRACH) provided in a UL radio frame and a scheduled transmission signal transmitted through a Physical Uplink Shared CHannel (PUSCH).

The RA control unit 117 controls random access based on the control signal extracted by the RA control signal extraction unit 116. Specifically, when a random access preamble signal is detected, the RA control unit 117 determines whether a CC used for transmitting the signal corresponds to the type of a source mobile station (LTE mobile station or LTE-A mobile station), and decides whether to accept access or not. Subsequently, the RA control unit 117 notifies the RA control signal generation unit 118 of the decision. In addition, when a scheduled transmission signal is properly detected, the RA control unit 117 notifies the RA control signal generation unit 118 accordingly.

Based on the notification from the scheduler 115 and the RA control unit 117, the RA control signal generation unit 118 generates a control signal to be transmitted to the mobile station 300/400 at the time of random access. Specifically, the RA control signal generation unit 118 generates, as a response to the random access preamble signal, a random access response signal indicating whether to accept the access. In addition, the RA control signal generation unit 118 generates a contention resolution signal as a response to the scheduled transmission signal.

The broadcast information generation unit 119 generates, with respect to each CC, broadcast information to be transmitted (broadcast) through the PBCH. The broadcast information includes, for example, information indicating a frequency bandwidth of the corresponding CC. The extended broadcast information generation unit 120 generates extended broadcast information to be transmitted (broadcast) through the E-PBCH. The extended broadcast information includes information indicating correspondence between CC#1 to CC#5 and the types of mobile stations. The control information generation unit 121 generates L1/L2 control information to be transmitted through the PDCCH. This control information includes, for example, information indicating a result of UL wireless resource allocation and an MCS to be applied. The synchronization signal generation unit 122 generates a P-SCH sequence and an S-SCH sequence with respect to each CC. The RS generation unit 123 generates a reference signal which is a known signal.

The mapping unit 124 maps, in a DL radio frame, user data received from the upper-level network and control information or control signals generated by the RA control signal generation unit 118, the broadcast information generation unit 119, the extended broadcast information generation unit 120, the control information generation unit 121, the synchronization signal generation unit 122, and the RS generation unit 123. Then, the mapping unit 124 successively outputs the mapped data to the coding and modulation unit 125.

The coding and modulation unit 125 performs error correction coding and modulation on the data acquired from the mapping unit 124, and generates a baseband signal to be a transmission signal and then outputs the baseband signal to the wireless transmission unit 126. For the coding and modulation, a predetermined MCS or an MCS notified of by the scheduler 115 is used. Choices for the modulation scheme include digital modulation schemes such as QPSK and 16QAM. Choices for the coding scheme include turbo coding and LDPC coding.

The wireless transmission unit 126 performs wireless signal processing on the transmission signal acquired from the coding and modulation unit 125 and converts the baseband signal as a low-frequency signal into a high-frequency wireless signal (up-conversion). For the wireless signal processing, the wireless transmission unit 126 includes, for example, a D/A (Digital to Analog) converter, a frequency converter, a BPF, and a power amplifier. Frequency bands for transmission are notified of by the scheduler 115.

Figure 18:
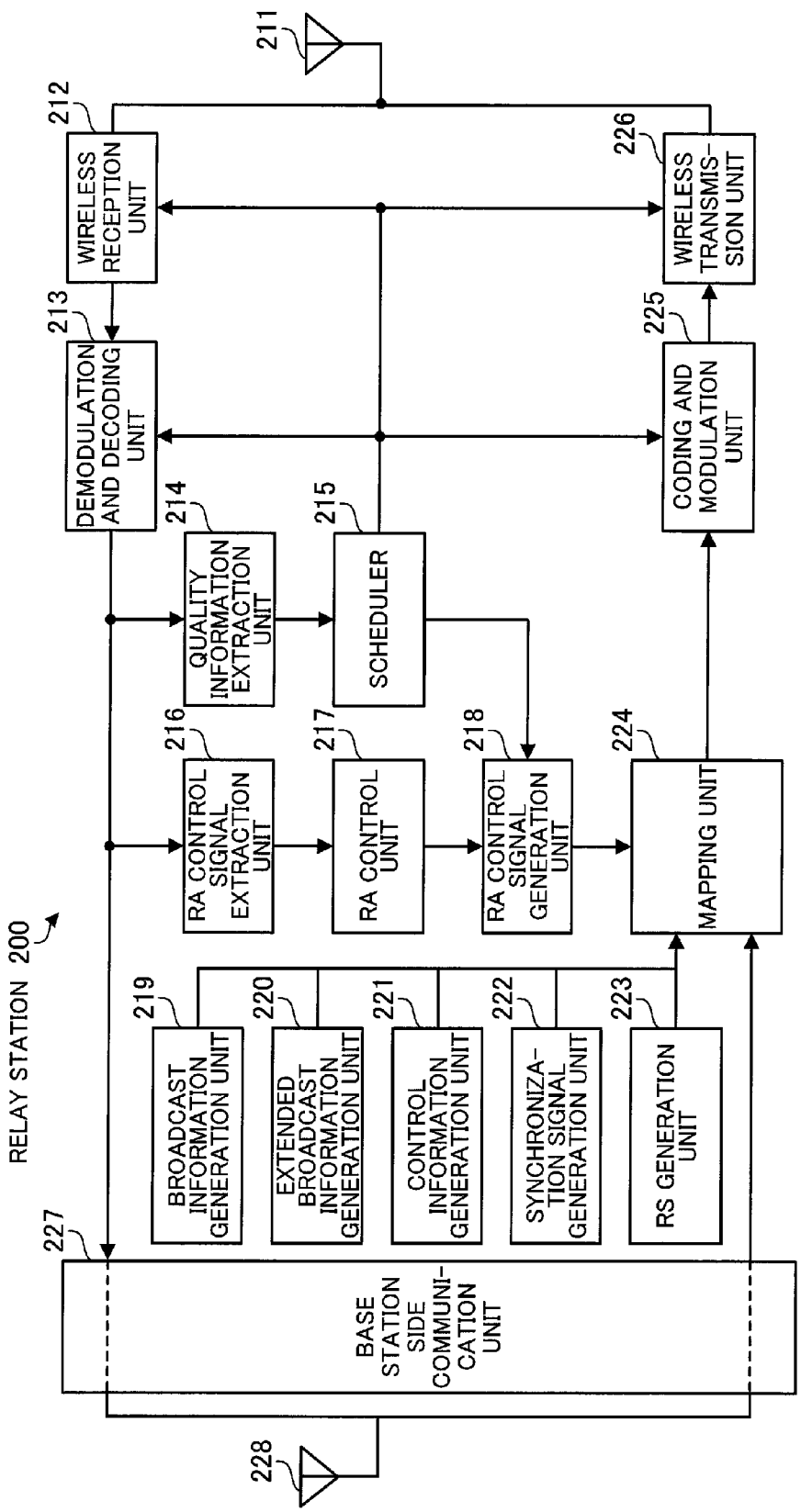
FIG. 18 is a block diagram of a relay station.

FIG. 18 is a block diagram of a relay station. The relay station 200 includes transmitting and receiving antennas 211 and 228; a wireless reception unit 212; a demodulation and decoding unit 213; a quality information extraction unit 214; a scheduler 215; an RA control signal extraction unit 216; an RA control unit 217; an RA control signal generation unit 218; a broadcast information generation unit 219; an extended broadcast information generation unit 220; a control information generation unit 221; a synchronization signal generation unit 222; an RS generation unit 223; a mapping unit 224; a coding and modulation unit 225; a wireless transmission unit 226; and a base station side communication unit 227.

Each of modules from the transmitting and receiving antenna 211 to the wireless transmission unit 226 performs similar processing to that of a module with the same name in the base station 100 of FIG. 18. These modules perform wireless communication processing between the relay station 200 and the mobile station 300/400.

The base station side communication unit 227 performs wireless communication processing between the relay station 200 and the base station 100. The base station side communication unit 227 performs error correction coding, modulation, and up-conversion on the user data (transmission data of the mobile station 300/400) acquired from the demodulation and decoding unit 213, and then outputs an obtained transmission signal to the transmitting and receiving antenna 228. In addition, the base station side communication unit 227 performs down-conversion, demodulation, and error correction decoding on a wireless signal acquired from the transmitting and receiving antenna 228, and then outputs extracted user data (transmission data of the base station 100) to the mapping unit 224.

The transmitting and receiving antenna 228 receives a wireless signal transmitted by the base station 100 and outputs the received signal to the base station side communication unit 227. In addition, the transmitting and receiving antenna 228 outputs a transmission signal acquired from the base station side communication unit 227. Note that instead of providing the transmitting and receiving antenna 211 and the transmitting and receiving antenna 228 separately, a transmitting and receiving antenna capable of performing wireless communication with both the base station 100 and the mobile station 300/400 in parallel may be provided.

Figure 19:
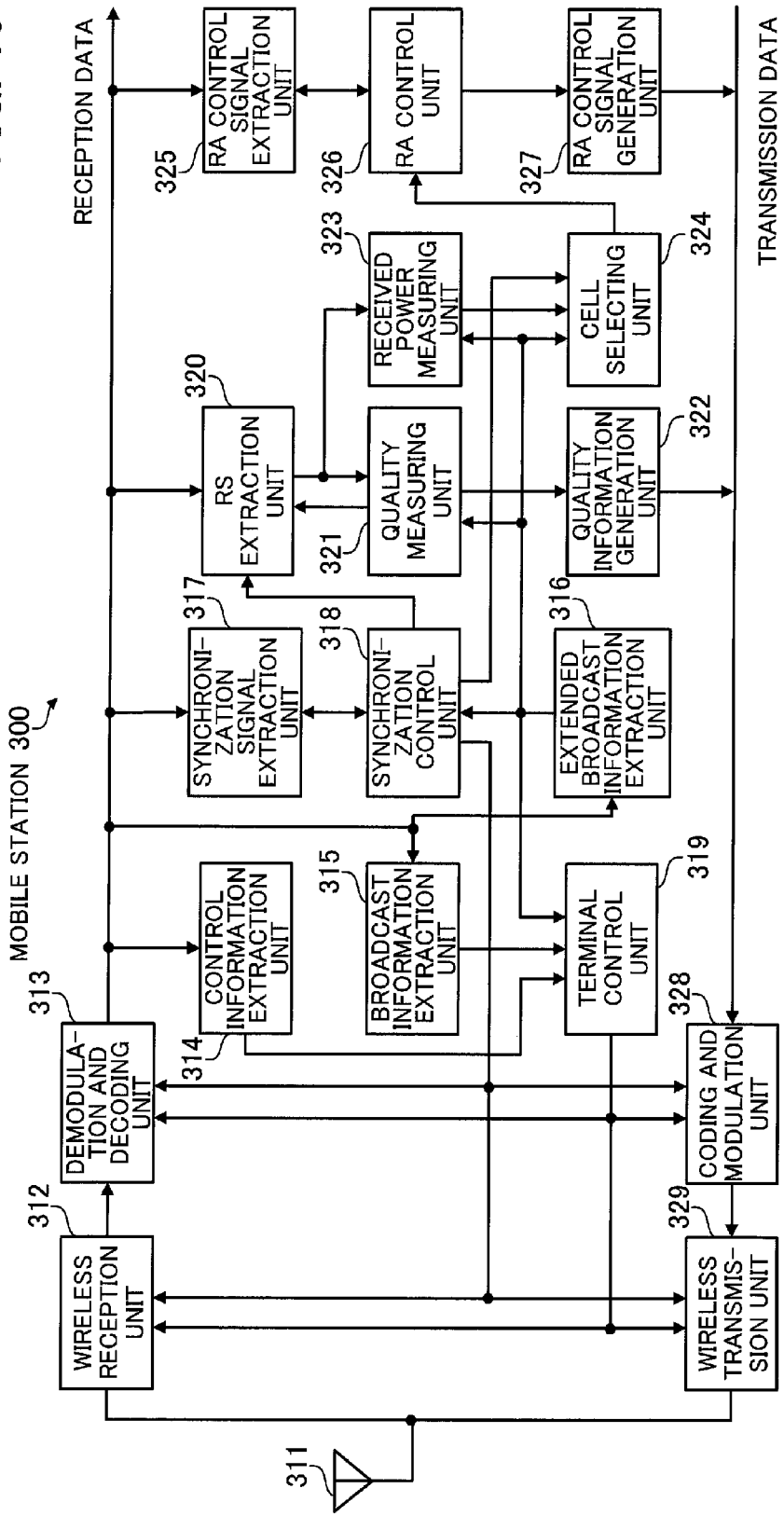
FIG. 19 is a block diagram of a mobile station.

FIG. 19 is a block diagram of a mobile station. The mobile station 300 includes a transmitting and receiving antenna 311; a wireless reception unit 312; a demodulation and decoding unit 313; a control information extraction unit 314; a broadcast information extraction unit 315; an extended broadcast information extraction unit 316; a synchronization signal extraction unit 317; a synchronization control unit 318; a terminal control unit 319; an RS extraction unit 320; a quality measuring unit 321; a quality information generation unit 322; a received power measuring unit 323; a cell selecting unit 324; an RA control signal extraction unit 325; an RA control unit 326; an RA control signal generation unit 327; a coding and modulation unit 328; and a wireless transmission unit 329.

The transmitting and receiving antenna 311 receives wireless signals transmitted by the base station 100 and the relay station 200, and then outputs the received signals to the wireless reception unit 312. In addition, the transmitting and receiving antenna 311 outputs a transmission signal acquired from the wireless transmission unit 329. Note that, instead of the two-way transmitting and receiving antenna, a transmitting antenna and a receiving antenna may be separately provided in the mobile station 300. In addition, diversity transmission may be employed using multiple transmitting and receiving antennas.

The wireless reception unit 312 performs wireless signal processing on a signal acquired from the transmitting and receiving antenna 311 and converts the high-frequency wireless signal into a baseband signal as a low-frequency signal (down-conversion). For the wireless signal processing, the wireless reception unit 312 includes, for example, an LNA, a frequency converter, a BPF, an A/D converter. Frequency bands for reception are notified of by the terminal control unit 319.

The demodulation and decoding unit 313 demodulates and error correction decodes the baseband signal acquired from the wireless reception unit 312, and then outputs obtained data (including user data and control information). The demodulation and decoding are performed by methods corresponding to a predetermined MCS or an MCS notified of by the terminal control unit 319.

The control information extraction unit 314 extracts L1/L2 control information transmitted by the base station 100 or the relay station 200 through the PDCCH. The control information includes, for example, information indicating UL wireless resource allocation and an MCS to be applied. Then, the control information extraction unit 314 outputs the extracted control information to the terminal control unit 319.

The broadcast information extraction unit 315 extracts, with respect to each CC, broadcast information broadcast by the base station 100 or the relay station 200 through the PBCH. The broadcast information includes, for example, information indicating a frequency bandwidth of the CC in which the broadcast information is transmitted. The broadcast information extraction unit 315 outputs the extracted broadcast information to the terminal control unit 319.

The extended broadcast information extraction unit 316 extracts extended broadcast information broadcast by the base station 100 or the relay station 200 through the E-PBCH. The E-PBCH is provided to at least one CC. The extended broadcast information includes information indicating correspondence between CC#1 to CC#5 and types of mobile stations. The extended broadcast information extraction unit 316 outputs the extracted extended broadcast information to the synchronization control unit 318, the terminal control unit 319, the quality measuring unit 321, the received power measuring unit 323, and the cell selecting unit 324.

The synchronization signal extraction unit 317 extracts, with respect to each CC, synchronization signals (primary and secondary synchronization signals) transmitted by the base station 100 or the relay station 200 via the P-SCH and the S-SCH. Then, the synchronization signal extraction unit 317 outputs the synchronization signals to the synchronization control unit 318.

The synchronization control unit 318 detects a timing of 10-ms radio frame based on the synchronization signals extracted by the synchronization signal extraction unit 317. In addition, the synchronization control unit 318 detects a timing of 0.5-ms slot. Subsequently, the synchronization control unit 318 notifies the wireless reception unit 312, the demodulation and decoding unit 313, the RS extraction unit 320, the coding and modulation unit 328, and the wireless transmission unit 329 of the detected radio frame and slot timings, and performs feedback to the synchronization signal extraction unit 317. In addition, the synchronization control unit 318 specifies P-SCH sequences and S-SCH sequences used by the base station 100 or the relay station 200, and then specifies cell IDs based on the combinations of the sequences. Subsequently, the synchronization control unit 318 notifies the cell selecting unit 324 of the specified cell IDs.

The terminal control unit 319 determines CCs available for LTE-A mobile stations by referring to the extended broadcast information extracted by the extended broadcast information extraction unit 316. In addition, the terminal control unit 319 controls access to the base station 100 or the relay station 200 by referring to the broadcast information extracted by the broadcast information extraction unit 315. In addition, the terminal control unit 319 refers to the control information extracted by the control information extraction unit 314 to thereby determine wireless resources allocated to the mobile station 300 as well as determine an applied MCS. Subsequently, the terminal control unit 319 controls operation of the wireless reception unit 312, the demodulation and decoding unit 313, the coding and modulation unit 328, and the wireless transmission unit 329.

The RS extraction unit 320 extracts a reference signal transmitted by the base station 100 or the relay station 200 based on the radio frame and slot timings detected by the synchronization control unit 318. Then, the RS extraction unit 320 outputs the extracted reference signal to the quality measuring unit 321 and the received power measuring unit 323.

Using the reference signal extracted by the RS extraction unit 320, the quality measuring unit 321 measures reception quality of the CCs available to LTE-A mobile stations, which CCs are indicated by the extended broadcast information. Reception quality of CCs not available for LTE-A mobile stations need not be measured. Then, the quality measuring unit 321 notifies the quality information generation unit 322 of the measurement results. The quality measuring unit 321 feeds the measurement results to the RS extraction unit 320. As an index indicating the reception quality, an SINR (Signal to Interference and Noise Ratio) may be used, for example.

The quality information generation unit 322 generates control information (measurement report) indicating the reception quality measured by the quality measuring unit 321. As a measurement report, a CQI (Channel Quality Indication) which expresses the reception quality using a discrete value may be used, for example.

The received power measuring unit 323 measures received power (receiving electric field intensity) of each of CC#1 to CC#5 using the reference signal extracted by the RS extraction unit 320. In the case where at the time of the measurement, CCs available for LTE-A mobile stations are notified of based on the extended broadcast information extracted by the extended broadcast information extraction unit 316, received power of CCs not available for LTE-A mobile stations need not be measured. Subsequently, the received power measuring unit 323 notifies the cell selecting unit 324 of the measurement results.

The cell selecting unit 324 selects a cell to which the mobile station 300 sets up a connection based on the cell IDs of the neighboring cells specified by the synchronization control unit 318 and the received power measured by the received power measuring unit 323. Preferably, the cell selecting unit 324 selects a cell having the highest received power. In addition, the cell selecting unit 324 selects a CC to be used for random access based on the extended broadcast information extracted by the extended broadcast information extraction unit 316 and the received power of each CC. Preferably, the cell selecting unit 324 selects, among connection available CCs, a CC having the highest received power. Subsequently, the cell selecting unit 324 notifies the RA control unit 326 of the connection cell and the CC to be used.

The RA control signal extraction unit 325 extracts a control signal transmitted by the base station 100 or the relay station 200 through the PDSCH at the time of random access. The control signal includes a random access response signal and a contention resolution signal. Then, the RA control signal extraction unit 325 outputs the extracted control signal to the RA control unit 326.

On receiving notification of the connection cell and the CC to be used from the cell selecting unit 324, the RA control unit 326 instructs the RA control signal generation unit 327 to transmit a random access preamble signal using the notified CC. Further, the RA control unit 326 instructs the RA control signal extraction unit 325 to extract a response control signal. When the random access response signal is extracted by the RA control signal extraction unit 325, the RA control unit 326 instructs the RA control signal generation unit 327 to transmit a scheduled transmission signal.

In response to the instruction from the RA control unit 326, the RA control signal generation unit 327 generates the random access preamble signal to be transmitted through the PRACH. In addition, in response to the instruction from the RA control unit 326, the RA control signal generation unit 327 generates the scheduled transmission signal to be transmitted through the PUSCH.

The coding and modulation unit 328 performs error correction coding and modulation on the user data to be transmitted to the base station 100 or the relay station 200, the measurement report generated by the quality information generation unit 322, and the control signal generated by the RA control signal generation unit 327, and also maps these items in UL wireless resources allocated to the mobile station 300. For the coding and modulation, a predetermined MCS or an MCS notified of by the terminal control unit 319 is used. Subsequently, the coding and modulation unit 328 outputs, to the wireless transmission unit 329, a baseband signal as a transmission signal.

The wireless transmission unit 329 performs wireless signal processing on the transmission signal acquired from the coding and modulation unit 328 and converts the baseband signal as a low-frequency signal into a high-frequency wireless signal (up-conversion). For the wireless signal processing, the wireless transmission unit 329 includes, for example, a D/A converter, a frequency converter, a BPF, and a power amplifier. Frequency bands for transmission are notified of by the terminal control unit 319.

Figure 20:
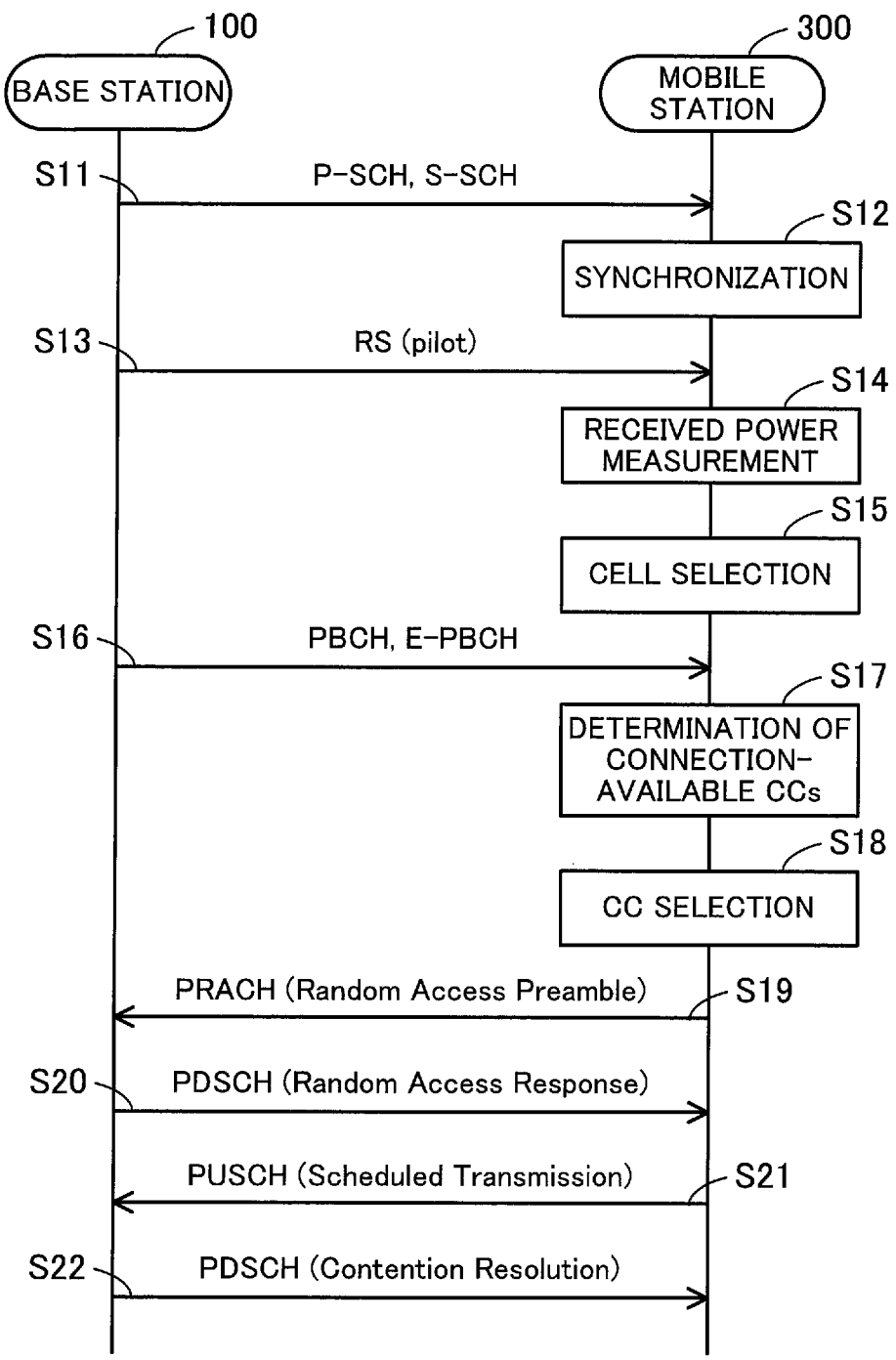
FIG. 20 is a sequence diagram illustrating a first example of setting up a connection from the mobile station to the base station.

FIG. 20 is a sequence diagram illustrating a first example of setting up a connection from a mobile station to a base station. The sequence represents the case where the mobile station 300, which is an LTE-A mobile station, sets up a connection to the base station 100. A similar sequence takes place in the case where the mobile station 300 sets up a connection to the relay station 200.

(Step S11) The base station 100 transmits synchronization signals through the P-SCH and S-SCH of each of CC#1 to CC#5. In the case of using cell IDs as IDs of CC#1 to CC#5, the base station 100 transmits different synchronization signals with respect to each CC. In addition, in the case of managing multiple cells, the base station 100 transmits synchronization signals with respect to each cell. In a similar fashion, the relay station 200 transmits synchronization signals.

(Step S12) Based on the synchronization signals transmitted by the base station 100, the mobile station 300 detects a timing of radio frames with respect to each cell so as to be synchronized with the base station 100. In the case where timings of radio frames of CC#1 to CC#5 are synchronized with each other, the mobile station 300 does not have to perform the timing detection for all the CCs. In a similar fashion, the mobile station 300 becomes synchronized with the relay station 200.

(Step S13) The base station 100 transmits a reference signal, which is a pilot signal, in each of CC#1 to CC#5. The reference signals transmitted in CC#1 to CC#5 may be all the same. In a similar fashion, the relay station 200 transmits reference signals.

(Step S14) Based on the reference signals transmitted by the base station 100, the mobile station 300 measures received power from the base station 100 with respect to each cell. The received power may be measured for one of the CCs or multiple CCs. In the former case, a frequency band to be measured may be determined in advance. In the latter case, a maximum or average received power value of the multiple CCs may be defined as the received power from the base station 100. In a similar fashion, the mobile station 300 measures received power from the relay station 200.

(Step S15) Based on the received power measured in Step S14, the mobile station 300 selects a cell to set up a connection. Preferably, the mobile station 300 selects a cell having the highest received power. Assume here that the mobile station 300 selects a cell managed by the base station 100.

(Step S16) The base station 100 transmits (broadcasts) broadcast information through the PBCH of each of CC#1 to CC#5. In addition, the base station 100 transmits (broadcasts) extended broadcast information through the E-PBCH which is provided at least one of CC#1 to CC#5.

(Step S17) Based on the extended broadcast information transmitted (broadcast) by the base station 100, the mobile station 300 determines, among CC#1 to CC#5, one or more CCs to which LTE-A mobile stations are able to set up a connection.

(Step S18) Among the one or more CCs determined to be available for LTE-A mobile stations in Step S17, the mobile station 300 selects a CC to be used for random access. In the case where there are multiple CCs, arbitrary one may be selected, or one with the highest received power may be selected.

Note that, in the sequence example of FIG. 20, a CC to be used is selected after the selection of a cell to which the mobile station 300 sets up a connection. However, the cell selection and the CC selection may be performed at the same time. For example, without narrowing down a cell, the mobile station 300 may measure received power for all CCs of detected neighboring cells and select, among the CCs, a CC available for LTE-A mobile stations to set up a connection and yielding the highest received power. In addition, before the cell selection, the mobile station 300 may determine, with respect to each neighboring cell, CCs available for LTE-A mobile stations to set up a connection, and then measure received power of the CCs so as to select a CC having higher received power.

(Step S19) The mobile station 300 checks information to be used for setting up a connection (for example, information indicating a frequency bandwidth) to the CC selected in Step S18, which information is included in broadcast information corresponding to the selected CC. Subsequently, the mobile station 300 transmits a random access preamble to the base station 100 through the PRACH provided in the UL radio frame of the selected CC.

(Step S20) In the case where the CC with which the random access preamble is received is available for LTE-A mobile stations to set up a connection and the base station 100 has available wireless resources to accommodate the mobile station 300, the base station 100 allows the mobile station 300 to set up a connection. In the case of allowing the connection, the base station 100 transmits a random access response indicating a connection setup permission through the PDSCH provided in the DL radio frame of the CC with which the random access preamble is received. At that point, the base station 100 allocates, to the mobile station 300, UL wireless resources to be used in Step S21.

(Step S21) In order to determine whether communication is normally performed, the mobile station 300 transmits scheduled transmission, which is a predetermined message, to the base station 100 using the UL wireless resources (PUSCH) allocated in Step S20.

(Step S22) The base station 100 determines whether to have correctly received the scheduled transmission. Subsequently, the base station 100 transmits, as a response message, contention resolution indicating a reception result to the mobile station 300 through the PDSCH.

As described above, by receiving and referring to the extended broadcast information, the mobile station 300 which is an LTE-A mobile station is able to determine a CC available for LTE-A mobile stations before making random access. Accordingly, the mobile station 300 does not make an attempt to set up a connection to CCs unavailable for LTE-A mobile stations, which eliminates useless random access procedures. In addition, by preliminarily determining CCs available for LTE-A mobile stations, the mobile station 300 is able to narrow down CCs for the received power measurement, which reduces the processing load of the mobile station 300.

On the other hand, the mobile station 400 which is an LTE mobile station is not able to refer to the extended broadcast information. Accordingly, even in the case where the base station 100 or the relay station 200 limits CCs available for LTE mobile stations, the mobile station 400 is not able to determine, before making random access, which CC is available for LTE mobile stations. Therefore, the mobile station 400 may cause a random access failure.

Figure 21:
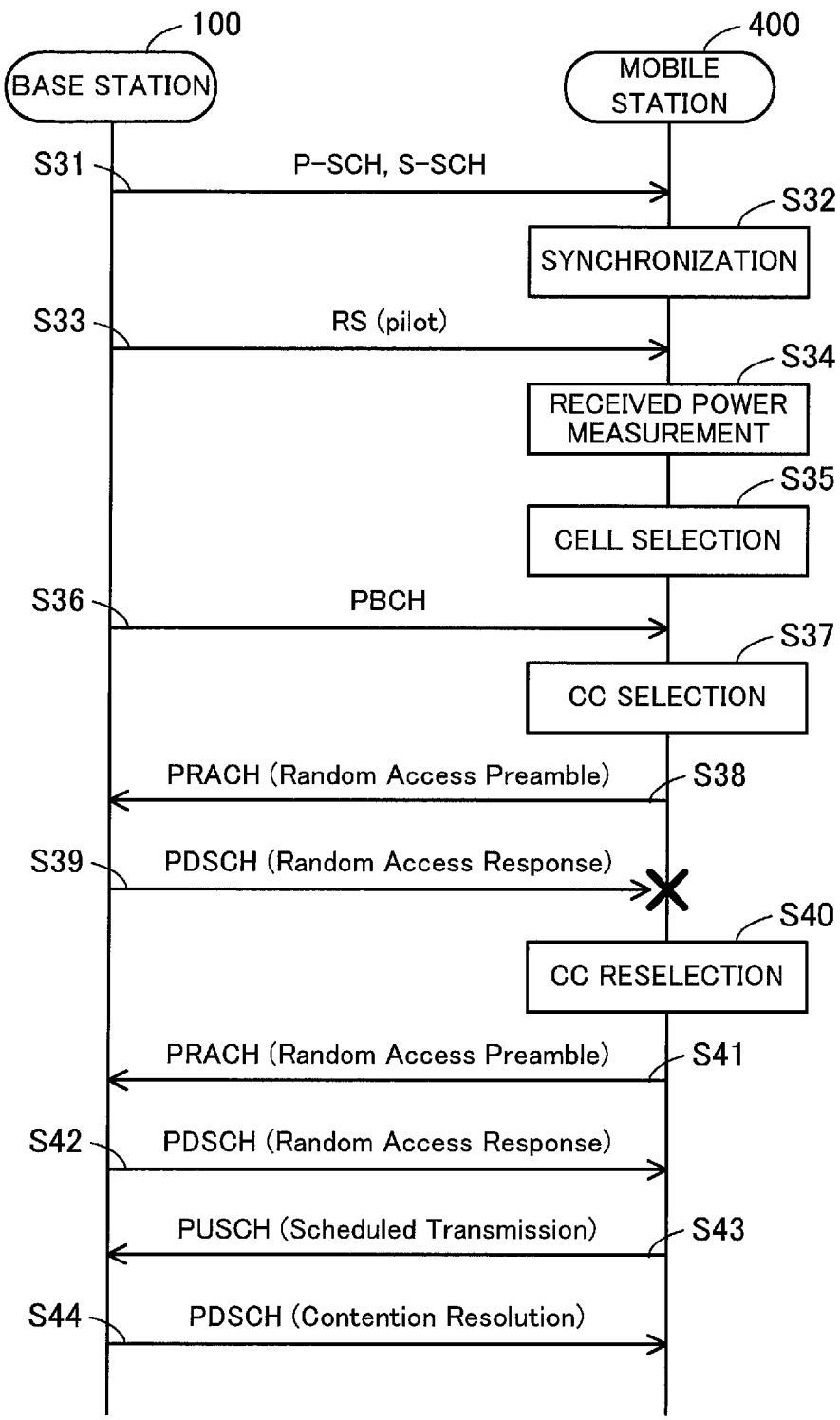
FIG. 21 is a sequence diagram illustrating a second example of setting up a connection from the mobile station to the base station.

FIG. 21 is a sequence diagram illustrating a second example of setting up a connection from a mobile station to a base station. The sequence represents the case where the mobile station 400, which is an LTE mobile station, sets up a connection to the base station 100. A similar sequence takes place in the case where the mobile station 400 sets up a connection to the relay station 200.

(Step S31) The base station 100 transmits synchronization signals through the P-SCH and S-SCH of each of CC#1 to CC#5. In the case of using cell IDs as IDs of CC#1 to CC#5, the base station 100 transmits different synchronization signals with respect to each CC. In addition, in the case of managing multiple cells, the base station 100 transmits synchronization signals with respect to each cell. In a similar fashion, the relay station 200 transmits synchronization signals.

(Step S32) Based on the synchronization signal transmitted by the base station 100, the mobile station 400 detects a timing of radio frame with respect to each cell so as to be synchronized with the base station 100. In the case where cell IDs are used as IDs of the CCs, the mobile station 400 may recognize CC#1 to CC#5 as cells (virtually) different from each other. In a similar fashion, the mobile station 400 becomes synchronized with the relay station 200.

(Step S33) The base station 100 transmits a reference signal, which is a pilot signal, in each of CC#1 to CC#5. In a similar fashion, the relay station 200 transmits reference signals.

(Step S34) Based on the reference signals transmitted by the base station 100, the mobile station 400 measures received power from the base station 100 with respect to each cell and each CC. In a similar fashion, the mobile station 300 measures received power from the relay station 200.

(Step S35) Based on the received power measured in Step S34, the mobile station 400 selects a cell to set up a connection. Preferably, the mobile station 400 selects a cell having the highest received power. Assume here that the mobile station 400 selects a cell managed by the base station 100.

(Step S36) The base station 100 transmits (broadcasts) broadcast information through the PBCH of each of CC#1 to CC#5.

(Step S37) Among CC#1 to CC#5 of the cell selected in Step S35, the mobile station 400 selects a CC to be used for random access. Among CC#1 to CC#5, an arbitrary one may be selected, or one with the highest received power may be selected. Note that in the case of recognizing CC#1 to CC#5 as cells (virtually) different from each other, the mobile station 400 may perform the cell selection and CC selection at the same time based on the received power of each of the CCs.

(Step S38) The mobile station 400 checks information to be used for setting up a connection (for example, information indicating a frequency bandwidth) to the CC selected in Step S37, which information is included in broadcast information corresponding to the selected CC. Subsequently, the mobile station 400 transmits a random access preamble to the base station 100 though the PRACH provided in the UL radio frame of the selected CC. However, assume here that the selected CC is a CC to which LTE mobile stations are unable to set up a connection.

(Step S39) In the case where the CC with which the random access preamble is received is not available for LTE mobile stations to set up a connection, the base station 100 rejects the connection. In the case of rejecting the connection, the base station 100 transmits a random access response indicating connection rejection through the PDSCH provided in the DL radio frame of the CC with which the random access preamble is received. Alternatively, the base station 100 does not make a response to the random access preamble.

(Step S40) The mobile station 400 determines that the random access is failed in the case of receiving a random access response indicating a connection rejection or receiving no response within a predetermined time period after transmission of the random access preamble. Subsequently, the mobile station 400 selects another CC of the cell, different from one selected in Step S35.

(Step S41) The mobile station 400 checks information to be used for setting up a connection to the CC selected in Step S40, which information is included in broadcast information corresponding to the selected CC. Subsequently, the mobile station 400 transmits a random access preamble to the base station 100 through the PRACH provided in the UL radio frame of the selected CC. Assume here that the selected CC is a CC to which LTE mobile stations are able to set up a connection.

(Step S42) In the case where the CC with which the random access preamble is received is available for LTE mobile stations to set up a connection and the base station 100 has available wireless resources to accommodate the mobile station 400, the base station 100 allows the mobile station 400 to set up a connection. In the case of allowing the connection, the base station 100 transmits a random access response indicating a connection setup permission through the PDSCH provided in the DL radio frame of the CC with which the random access preamble is received. At that point, the base station 100 allocates, to the mobile station 400, UL wireless resources to be used in Step S43.

(Step S43) In order to determine whether communication is correctly performed, the mobile station 400 transmits scheduled transmission to the base station 100 using the UL wireless resources (PUSCH) allocated in Step S42.

(Step S44) The base station 100 determines whether to have correctly received the scheduled transmission. Subsequently, the base station 100 transmits, as a response message, contention resolution indicating a reception result to the mobile station 400 through the PDSCH.

As described above, the mobile station 400 which is an LTE mobile station cannot determine CCs available for LTE mobile stations before making random access since being unable to refer to the extended broadcast information. Accordingly, the mobile station 400 may cause a random access failure. In addition, since being unable to determine CCs available for LTE mobile stations, the mobile station 400 is not able to narrow down CCs for the received power measurement in advance.

Next described is the relationship between CC#1 to CC#5 and the E-PBCH.

Figure 22:
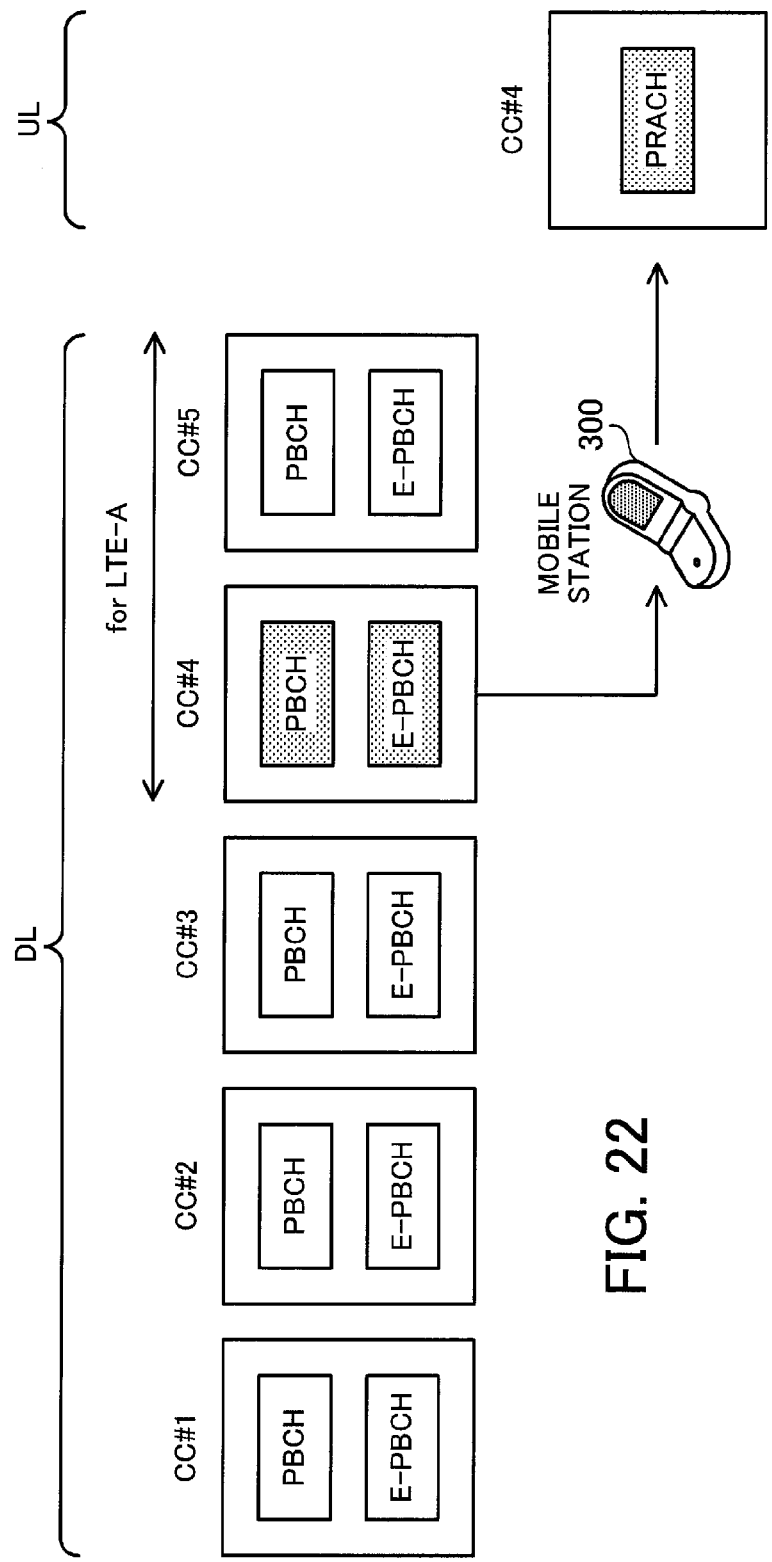
FIG. 22 illustrates a first example of transmission and reception of extended broadcast information.

FIG. 22 illustrates a first example of transmission and reception of extended broadcast information. According to the example of FIG. 22, the base station 100 or the relay station 200 performs control in such a manner as to allow LTE mobile stations to use CC#1 to CC#3 and allow LTE-A mobile stations to use CC#4 and CC#5.

In addition, the base station 100 or the relay station 200 provides the PBCH and the E-PBCH for each of CC#1 to CC#5. Through the PBCH of each CC, broadcast information including information to be used for setting up a connection to the CC is transmitted. The broadcast information transmitted through the PBCH may be different among CCs. Through each E-PBCH, extended broadcast information which includes information indicating the relationship between CC#1 to CC#5 and types of mobile stations is transmitted. The extended broadcast information transmitted through the E-PBCH may be the same among all the CCs.

In this case, the mobile station 300 which is an LTE-A mobile station receives the extended broadcast information transmitted through the E-PBCH of one of CC#1 to CC#5. From the received extended broadcast information, the mobile station 300 recognizes that CC#4 and CC#5 are available for LTE-A mobile stations. Subsequently, the mobile station 300 selects one of CC#4 and CC#5 as a CC to be used for random access. The mobile station 300 may make a selection between CC#4 and CC#5 based on results of the received power measurements. According to the example of FIG. 22, the mobile station 300 selects CC#4 by referring to the extended broadcast information broadcast in CC#4.

After selecting CC#4 as a CC for random access, the mobile station 300 refers to the broadcast information transmitted through the PBCH of CC#4 and transmits a random access preamble through the PRACH provided in the UL radio frame of CC#4. This starts a random access procedure between the base station 100 or the relay station 200 and the mobile station 300. Thus, according to the example of FIG. 22, the E-PBCH is provided for each of all the CCs, and therefore, the mobile station 300 is able to recognize CCs available for LTE-A mobile stations by referring to one arbitrary CC.

Note that, since being an LTE-A mobile station, the mobile station 300 is able to use CC#4 and CC#5 in aggregation for data transmission and reception. In that case also, the mobile station 300 performs the random access procedures by, first, using one CC (CC#4). Subsequently, once a connection between the base station 100 or the relay station 200 and the mobile station 300 is established, the mobile station 300 is able to use another CC (CC#5) available for LTE-A mobile stations under the control of the base station 100 or the relay station 200.

In addition, the base station 100 or the relay station 200 may dynamically change, among CC#1 to CC#5, CCs available for LTE-A mobile stations according to the communication situation. In that case, the base station 100 or the relay station 200 dynamically changes contents of the extended broadcast information which is transmitted through the E-PBCH.

Figure 23:
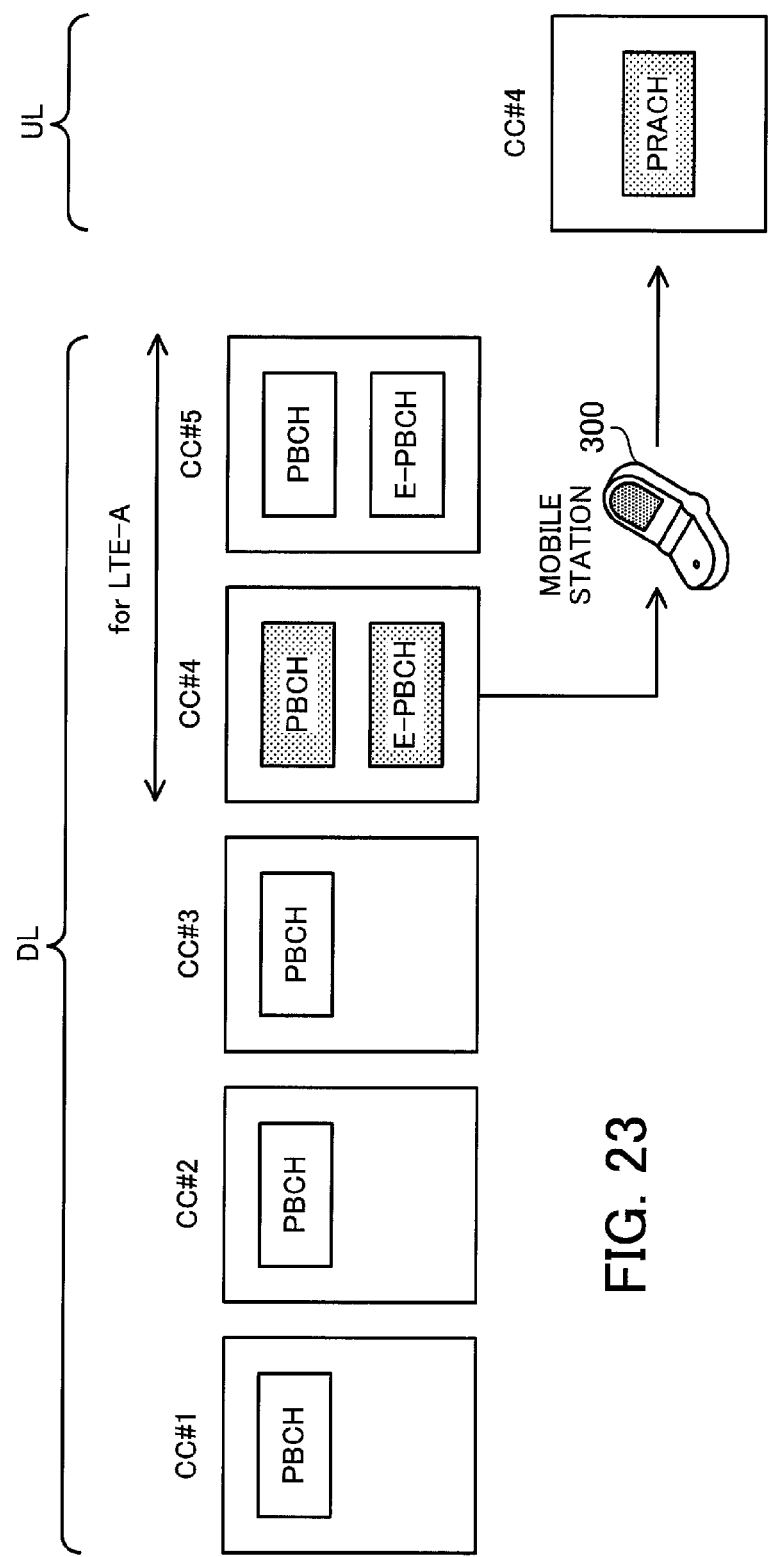
FIG. 23 illustrates a second example of transmission and reception of the extended broadcast information.

FIG. 23 illustrates a second example of transmission and reception of the extended broadcast information. According to the example of FIG. 23, the base station 100 or the relay station 200 provides the PBCH for each of CC#1 to CC#5 and provides the E-PBCH only for CC#4 and CC#5, which are available for LTE-A mobile stations. Through the PBCH of each CC, broadcast information including information to be used for setting up a connection to the CC is transmitted. Through the E-PBCH of CC#4 and CC#5, extended broadcast information which includes information indicating the relationship between CC#1 to CC#5 and types of mobile stations is transmitted.

In this case, the mobile station 300 which is an LTE-A mobile station receives the extended broadcast information transmitted through the E-PBCH of one of CC#4 and CC#5. From the received extended broadcast information, the mobile station 300 recognizes that CC#4 and CC#5 are available for LTE-A mobile stations. Subsequently, the mobile station 300 selects one of CC#4 and CC#5 as a CC to be used for random access. Thus, according to the example of FIG. 23, it is possible to save wireless resources since the E-PBCH is provided only for CCs available for LTE-A mobile stations.

Note that if it is predetermined that the E-PBCH is provided only for CCs available for LTE-A mobile stations, the mobile station 300 is able to determine that CCs in which the E-PBCH is detected are available for LTE-A mobile stations. In that case, the extended broadcast information transmitted through the E-PBCH of CC#4 and CC#5 does not have to include information regarding other CCs.

In addition, the base station 100 or the relay station 200 may provide the E-PBCH for only one of CC#4 and CC#5. That is, the E-PBCH may be provided for at least one of CCs available for LTE-A mobile stations. In addition, a CC in which the E-PBCH is provided may be referred to as a primary CC or a primary band, and other CCs may be referred to as extended CCs or extended bands.

Figure 24:
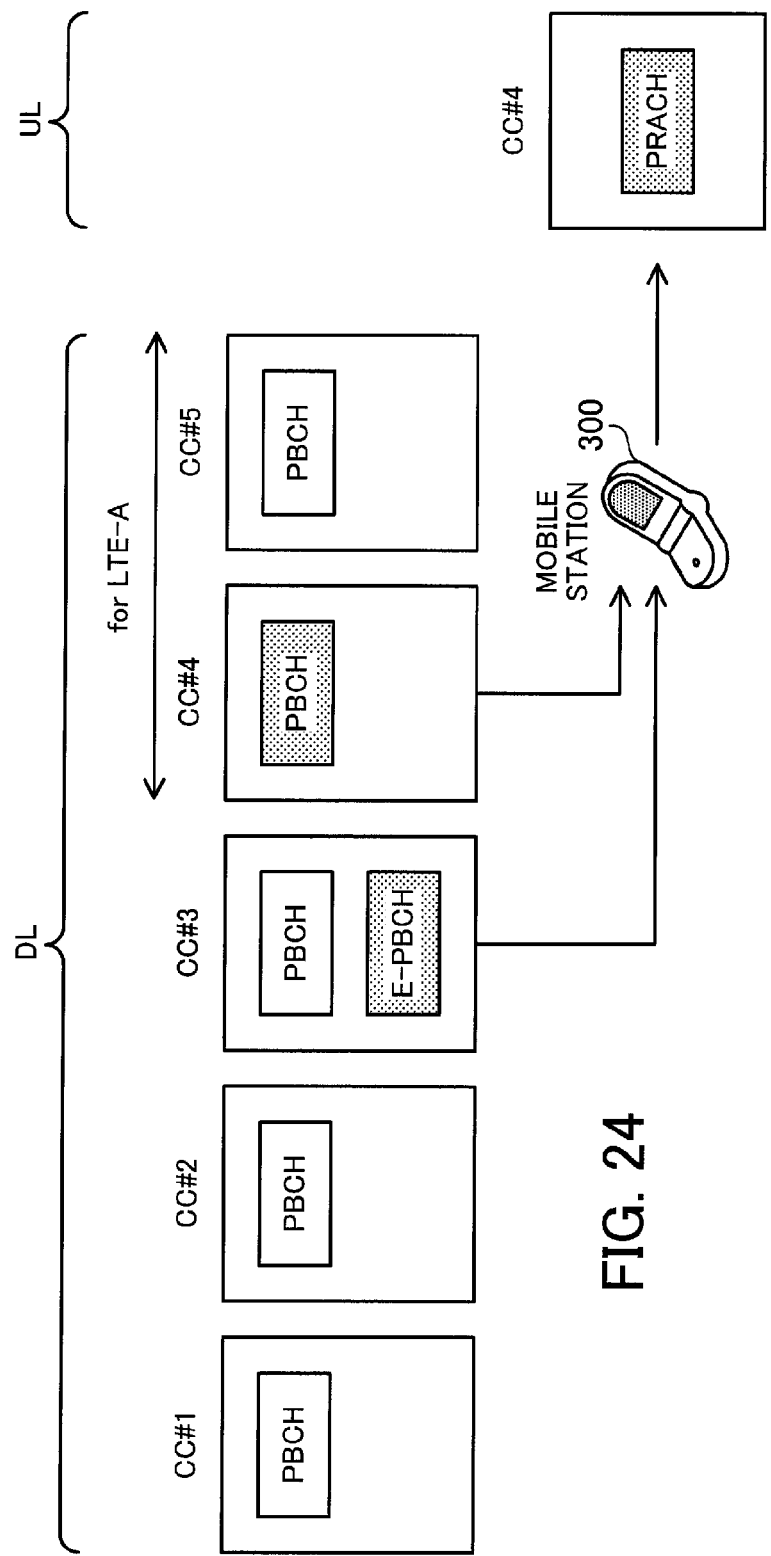
FIG. 24 illustrates a third example of transmission and reception of the extended broadcast information.

FIG. 24 illustrates a third example of transmission and reception of the extended broadcast information. According to the example of FIG. 24, the base station 100 or the relay station 200 provides the PBCH for each of CC#1 to CC#5 and provides the E-PBCH only for CC#3 which is located in the center of CC#1 to CC#5 on the frequency axis. Through the PBCH of each CC, broadcast information including information to be used for setting up a connection to the CC is transmitted. Through the E-PBCH, extended broadcast information which includes information indicating the relationship between CC#1 to CC#5 and types of mobile stations is transmitted.

In this case, the mobile station 300 which is an LTE-A mobile station receives the extended broadcast information transmitted through the E-PBCH of CC#3. From the received extended broadcast information, the mobile station 300 recognizes that CC#4 and CC#5 are available for LTE-A mobile stations. Subsequently, the mobile station 300 selects one of CC#4 and CC#5 as a CC to be used for random access. Thus, according to the example of FIG. 24, it is possible to save wireless resources since the E-PBCH is provided only for a predetermined CC. In addition, the mobile station 300 needs to refer only to the predetermined CC (for example, a CC located in the center of CC#1 to CC#5 on the frequency axis). Accordingly, this simplifies the processing of the mobile station 300 and reduces the processing load of the mobile station 300.

According to the mobile communication system of the second embodiment described above, the base station 100 and the relay station 200 are able to control connection-allowed CCs according to types of mobile stations. Therefore, this facilitates scheduling in an environment where both LTE-A mobile stations and LTE mobile stations are present. In addition, this enables easy allocation of broadband wireless resources to LTE-A mobile stations.

In addition, by referring to the extended broadcast information, an LTE-A mobile station is able to recognize available CCs before setting up a connection to the base station 100 or the relay station 200. Accordingly, even in the case where connection-available CCs are limited according to the types of mobile stations, the connection process is performed smoothly. In addition, the LTE-A mobile station is able to narrow down CCs for the received power measurements carried out at the time of the cell selection and CC selection, which reduces the processing load. In addition, the processing time for the cell selection (including a handover period) can be shortened.

Assume here that, for example, an LTE-A mobile station has detected three neighboring cells and, in each cell, two out of five CCs have been allocated to LTE-A mobile stations. In this case, in order to select a CC having the highest received power without referring to the extended broadcast information, received power needs to be measured for 15 CCs, which is obtained by multiplying 5 CCs by 3 neighboring cells. On the other hand, if CCs not available for LTE-A mobile stations are eliminated by reference to the extended broadcast information, received power needs to be measured only for 6 CCs, which is obtained by multiplying 2 CCs by 3 neighboring cells. That is, the processing of the LTE-A mobile station is reduced to about two-fifth.

It is clear that the extended broadcast channel may be used to transmit not only the information indicating the correspondence between multiple CCs and types of mobile stations but also various information required to be broadcast to LTE-A mobile stations. In addition, a new broadcast channel not defined in the LTE may be referred to as a name other than the "extended broadcast channel". For example, one of the conventional broadcast channel and the extended broadcast channel may be referred to as a first broadcast channel, and the other may be referred to as a second broadcast channel.

According to the above-described mobile communications system, wireless communication apparatus, mobile communications apparatus, and wireless communication method, it is possible to efficiently achieve communication control in consideration of the existence of multiple types of mobile stations.

All examples and conditional language provided herein are intended for pedagogical purposes of aiding the reader in understanding the invention and the concepts contributed by the inventor to further the art, and are not to be construed as limitation to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A mobile communications system comprising:
   a wireless communication apparatus including:
   a generation unit configured to generate first broadcast information which is used for communicating with a first-type mobile station and a second-type mobile station, and generate second broadcast information which is used for communicating with the second-type mobile station, the first-type mobile station performing communication based on a communication specification, the second-type mobile station performing communication based on another communication specification; and a transmission unit configured to broadcast the first broadcast information through a first physical broadcast channel and broadcast the second broadcast information through a second physical broadcast channel; and a mobile communications apparatus operating as the second-type mobile station and including:

a reception unit configured to receive the first broadcast information broadcasted through the first physical broadcast channel and the second broadcast information broadcasted through the second physical broadcast channel; and a control unit configured to control communication with the wireless communication apparatus using the received first and second broadcast information.

2. The mobile communications system according to claim 1, wherein the second broadcast information includes information indicating a relationship between a plurality of frequency bands used by the wireless communication apparatus for wireless communication and types of mobile stations, and based on the second broadcast information, the control unit determines, among the plurality of frequency bands, a frequency band available for the second-type mobile station.

3. The mobile communications system according to claim 2, wherein the second broadcast information indicates the relationship between the plurality of frequency bands and the types of mobile stations using identification information for identifying each of the plurality of frequency bands.

4. The mobile communications system according to claim 3, wherein the identification information is cell identification information assigned to each of the plurality of frequency bands or unique numbers within a single cell.

5. The mobile communications system according to claim 1, wherein the transmission unit sets the first physical broadcast channel in each of the plurality of frequency bands used by the wireless communication apparatus for wireless communication, and sets the second physical broadcast channel in at least one of the plurality of frequency bands.

6. The mobile communications system according to claim 5, wherein the transmission unit sets the second physical broadcast channel in, among the plurality of frequency bands, a frequency band available for the second-type mobile station.

7. The mobile communications system according to claim 1, wherein the second physical broadcast channel is set in a wireless resource adjacent to the first physical broadcast channel in terms of at least one of frequency and time.

8. The mobile communications system according to claim 1, wherein the second physical broadcast channel is set in a wireless resource adjacent to a synchronization channel used to transmit a synchronization signal, in terms of at least one of frequency and time.

9. The mobile communications system according to claim 1, wherein the second broadcast information includes information indicating a frequency band used by the second-type mobile station, and based on the second broadcast information, the control unit determines a frequency band available for the second-type mobile station among a plurality of frequency bands.

10. The mobile communications system according to claim 1, wherein the transmission unit sets the first physical broadcast channel in at least one of a plurality of frequency bands used by the wireless communication apparatus for wireless communication, and sets the second physical broadcast channel in at least one of the plurality of frequency bands.

11. The mobile communications system according to claim 10, wherein the transmission unit sets the second physical broadcast channel in, among the plurality of frequency bands, a frequency band available for the second-type mobile station.

12. A wireless communication apparatus comprising:

a generation unit configured to generate first broadcast information which is used for communicating with a first-type mobile station and a second-type mobile station, and generate second broadcast information which is used for communicating with the second-type mobile station, the first-type mobile station performing communication based on a communication specification, the second-type mobile station performing communication based on another communication specification; and a transmission unit configured to broadcast the first broadcast information through a first physical broadcast channel and broadcast the second broadcast information through a second physical broadcast channel.

13. A mobile communications apparatus comprising:

a reception unit configured to receive, through a first physical broadcast channel from a wireless communication apparatus capable of performing wireless communication with a first-type mobile station and a second-type mobile station, first broadcast information which is broadcasted and used for communicating with the first-type mobile station and the second-type mobile station, and to receive, through a second physical broadcast channel from the wireless communication apparatus, second broadcast information which is broadcasted and used for communicating with the second-type mobile station, the first-type mobile station performing communication based on a communication specification, the second-type mobile station performing communication based on another communication specification; and a control unit configured to control communication with the wireless communication apparatus using the received first and second broadcast information, wherein the mobile communications apparatus operates as the second-type mobile station.

14. A wireless communication method executed by a mobile communications system which includes a wireless communication apparatus and a mobile communications apparatus, the wireless communication method comprising:

generating, by the wireless communication apparatus, first broadcast information which is used for communicating with a first-type mobile station and a second-type mobile station, and generating second broadcast information which is used for communicating with the second-type mobile station, the first-type mobile station performing communication based on a communication specification, the second-type mobile station performing communication based on another communication specification;

broadcasting, by the wireless communication apparatus, the first broadcast information through a first physical broadcast channel and broadcasting the second broadcast information through a second physical broadcast channel;

receiving, by the mobile communication apparatus operating as the second-type mobile station, the first broadcast information broadcasted through the first physical broadcast channel and the second broadcast information broadcasted through the second physical broadcast channel; and controlling, by the mobile communications apparatus, communication with the wireless communication apparatus using the received first and second broadcast information.

\* \* \* \* \*